United States Patent
Widatalla et al.

(10) Patent No.: US 12,282,128 B2
(45) Date of Patent: Apr. 22, 2025

(54) SYSTEM AND METHOD FOR QUANTITATIVE SEISMIC INTEGRATION MODELING WORKFLOW

(71) Applicant: Saudi Arabian Oil Company, Dhahran (SA)

(72) Inventors: Muiz A. Elmardi Widatalla, Dhahran (SA); Aiman Malike Bakhorji, Dhahran (SA); Mukarram Ahmed, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/038,940

(22) Filed: Sep. 30, 2020

(65) Prior Publication Data

US 2022/0099851 A1   Mar. 31, 2022

(51) Int. Cl.
| | | |
|---|---|---|
| *G06F 30/20* | (2020.01) | |
| *G01V 1/28* | (2006.01) | |
| *G01V 1/32* | (2006.01) | |
| *G01V 1/34* | (2006.01) | |
| *G01V 1/40* | (2006.01) | |
| *G01V 20/00* | (2024.01) | |
| *G06F 113/08* | (2020.01) | |

(52) U.S. Cl.
CPC .............. *G01V 1/282* (2013.01); *G01V 1/32* (2013.01); *G01V 1/345* (2013.01); *G01V 1/40* (2013.01); *G01V 20/00* (2024.01); *G06F 30/20* (2020.01); *G01V 2210/66* (2013.01); *G06F 2113/08* (2020.01)

(58) Field of Classification Search
CPC . G01V 1/32; G01V 1/282; G01V 1/40; G01V 99/005; G01V 2210/66; G06F 30/20

USPC .................................................. 703/9, 10
See application file for complete search history.

(56) References Cited

U.S. PATENT DOCUMENTS

| | | |
|---|---|---|
| 7,373,251 B2 | 5/2008 | Hamman et al. |
| 8,379,482 B1 | 2/2013 | Khare et al. |
| 2014/0297187 A1 | 10/2014 | Miotti et al. |
| 2018/0275303 A1* | 9/2018 | Zhan ............... G01V 1/303 |
| 2019/0345815 A1 | 11/2019 | Mishra |

(Continued)

FOREIGN PATENT DOCUMENTS

WO   2018136448 A1   7/2018

OTHER PUBLICATIONS

Trudeng et al. (Using Stochastic Seismic Inversion as Input for 3D Geomechanical Models, (7 pages)). (Year: 2014).*

(Continued)

*Primary Examiner* — Andre Pierre Louis
(74) *Attorney, Agent, or Firm* — Leason Ellis LLP

(57) ABSTRACT

Systems and methods for quantitative seismic integrated modelling (QSIM) are disclosed for integrating the one, two and three-dimensional (1D, 2D, 3D) data from different geoscience domains within a framework in order to produce hi-resolution geocellular models that simulate realistic subsurface reservoir properties. The QSIM systems and methods accurately leverage the seismically derived reservoir rock properties, integrating the geophysical, geological and engineering information through an optimum rock physics models and takes in consideration all the empirically constrained templates to correct, validate and quality check all the input data.

20 Claims, 19 Drawing Sheets

(56) References Cited

U.S. PATENT DOCUMENTS

2020/0088896 A1* 3/2020 Schmedes .............. G01V 1/306
2021/0255349 A1* 8/2021 Zhou ...................... G06F 17/17

OTHER PUBLICATIONS

Mekap et al. (Stochastic seismic inversion for static reservoir modeling, (10 pages)). (Year: 2017).*
Extended European Search Report in corresponding EP Application No. 21198681.5 mailed Feb. 11, 2022.
Avseth P et al; Seismic Reservoir Mapping From 3-D Avo in North Sea Turbidite System; Geophysics, Society of Exploration Geophysicists, US, vol. 66, No. 4, Jul. 1, 2021; pp. 1157-1176.
Caers J et al; Geostatistical integration of rock physics, seismic amplitudes and geological models in North-Sea rubidite systems; SPE Annual Technical Conference And Exhibition, XX, XX, Sep. 30, 2001, pp. 1-16.
Bornard R et al; Petrophysical seismic inversion to determine more accurate and precise reservoir properties; EAGE Conference and Exhibition, XX, XX, vol. SPE, No. 94144, Jun. 13, 2005; pp. 1-13.
Office Action in corresponding Saudi Arabian Application No. 121430190 dated Nov. 6, 2023; 12 pages.
Trudeng, Tone, et al. "Using stochastic seismic inversion as input for 3D geomechanical models." IPTC 2014: International Petroleum Technology Conference. European Association of Geoscientists & Engineers, 2014; 7 pages.

* cited by examiner

SYSTEM AND METHOD FOR QUANTITATIVE SEISMIC INTEGRATION MODELING WORKFLOW

FIELD OF THE DISCLOSURE

The present disclosure relates to the fields of hydrocarbon exploration, development and production. In one particular arrangement, the present disclosure describes a computer implemented system and workflow for integrating the one, two and three-dimensional (1D, 2D, 3D) data from different geoscience domains within a framework in order to produce hi-resolution geocellular models that simulate realistic subsurface reservoir properties.

BACKGROUND OF THE DISCLOSURE

Seismic exploration may utilize a seismic energy source to generate acoustic signals that propagate into the earth and partially reflect off subsurface seismic reflectors (e.g., interfaces between subsurface layers). The reflected signals are recorded by sensors (e.g., receivers or geophones then send the signal to recording devices located in the seismic units) the recording units laid out in a seismic spread covering a region of the earth's surface. The recorded signals may then be processed to yield a seismic survey.

Integrating seismic amplitude data to geocellular models for deriving realistic reservoir properties is one of the fundamental challenges in the industry. There exists an unfulfilled need in the fields of hydrocarbon exploration, development and production for a technological solution that can process and analyze large amounts of sensor data (including pre-stack seismic data), build accurate high-resolution models incorporating integrating the one, two and three-dimensional (1D, 2D, 3D) data from different geoscience domains within a framework in order to produce hi-resolution geocellular models that simulate realistic subsurface reservoir properties, and implement the models effectively and efficiently to identify and implement hydrocarbon exploration opportunities.

SUMMARY OF THE DISCLOSURE

According to an aspect of the present disclosure, computer implemented method of modelling a subsurface region of the earth for hydrocarbon exploration, development, or production is provided. The method includes the step of receiving into a processing system pre-stack seismic datasets measured for one or more locations within the subsurface region and well log datasets measured from wells within the subsurface region, wherein the seismic datasets comprise three-dimensional seismic amplitude data and wherein the well log datasets comprise core data and elastic logs.

The method also includes the step of selecting, with the processing system, key wells from among the wells based on the well log datasets and generating, based on the seismic datasets, a geophysical model. In particular, generating the geophysical model includes measuring, based on the seismic amplitude data and the well log datasets for the key wells, an amplitude variation with offset (AVO) response of the seismic amplitude data to determine whether the measured AVO response meets prescribed requirements, and iteratively re-processing the seismic amplitude data at least until determining that the AVO response meets the prescribed requirements. Generating the geophysical model also includes the step of performing an inversion process on the re-processed seismic amplitude data.

Additionally, the method includes the step of generating based on the well log datasets, a geological model. In particular, generating the geological model includes defining core facies from the core data for the key wells, generating, based on the elastic logs for the key wells, an elastic facies model for predicting elastic facies from elastic logs, and associating the elastic facies with the core facies.

Moreover, the method includes the steps of generating a conceptual depositional model of the subsurface region and integrating the generated geophysical model, geological model and conceptual depositional model into a three-dimensional reservoir model for the subsurface region.

According to a further aspect, a system for modelling a subsurface region of the earth for hydrocarbon exploration, development, or production is disclosed. The system comprises a computing device including: a non-transitory storage medium, a processor and an interface for receiving pre-stack seismic datasets and well log datasets. The pre-stack seismic datasets are measured for one or more locations within the subsurface region and comprise three-dimensional seismic amplitude data. The well log datasets are measured from wells within the subsurface region and comprise core data and elastic logs.

The processor is configured by executing code that is in the form of one or more modules stored in the non-transitory storage medium. The one or more modules configure the processor to select key wells from among the wells based on the well log datasets. The processor is also configured to generate a geophysical model based on the seismic datasets and the well log datasets. In particular, the geophysical model is generated by: measuring, based on the seismic amplitude data and the well log datasets for the key wells, an amplitude variation with offset (AVO) response of the seismic amplitude data, determining whether the measured AVO response meets prescribed requirements, and then iteratively re-processing the seismic amplitude data until the AVO response meets the prescribed requirements. Generating the geophysical model also includes, performing an inversion process on the re-processed seismic amplitude data.

The processor is also configured to generate a geological model based on the well log datasets. In particular, generating the geological model includes defining core facies from the core data for the key wells; generating, based on the elastic logs for the key wells, an elastic facies model for predicting elastic facies from elastic logs; and associating the elastic facies with the core facies.

The processor is also configured to generate a conceptual depositional model of the subsurface region based on the well log datasets, and integrate the generated geophysical model, geological model and conceptual depositional model into a three-dimensional (3D) reservoir model for the subsurface region.

These and other aspects, features, and advantages can be appreciated from the accompanying description of certain embodiments of the disclosure and the accompanying drawing figures and claims.

BRIEF DESCRIPTION OF THE DRAWINGS

The foregoing and other features of the arrangements of the present disclosure will be more readily apparent from the following detailed description and drawings of an illustrative embodiment of an invention encompassed by the disclosure.

DESCRIPTION OF CERTAIN EMBODIMENTS OF THE DISCLOSURE

Figure 1A:
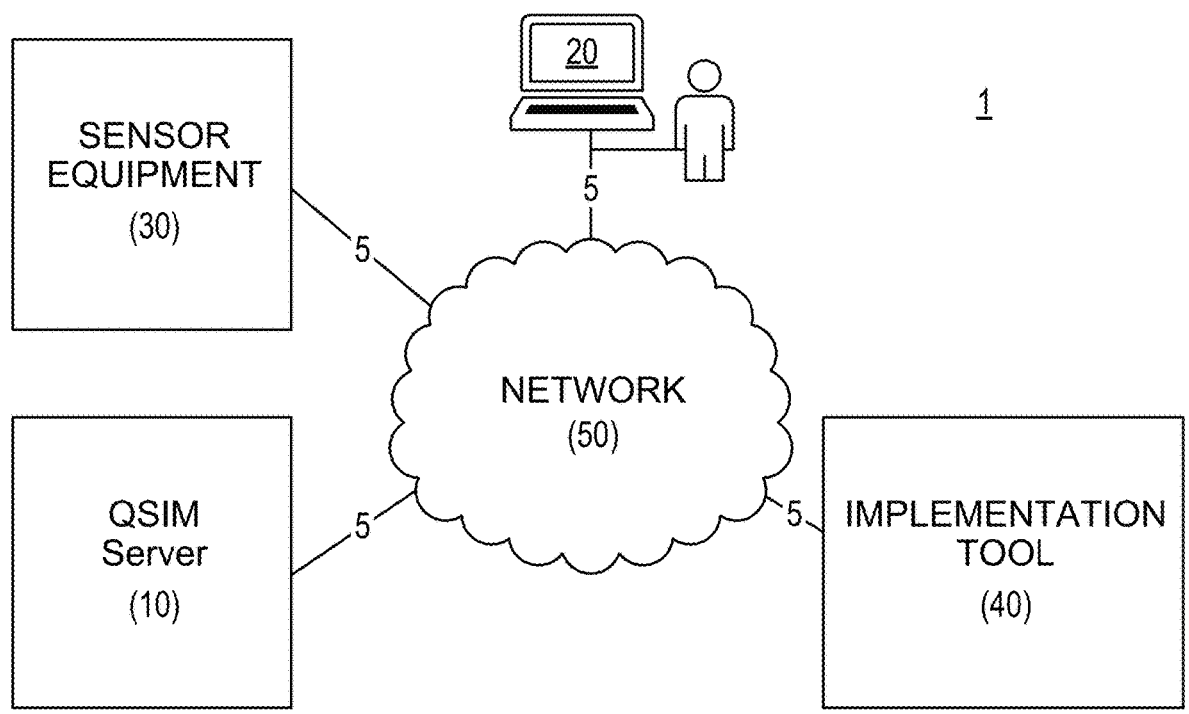
FIG. 1A shows an example of a quantitative seismic integrated modelling (QSIM) system, constructed according to the principles of the disclosure.

The disclosure and its various features and advantageous details are explained more fully with reference to the non-limiting embodiments and examples that are described or illustrated in the accompanying drawings and detailed in the following description. It should be noted that features illustrated in the drawings are not necessarily drawn to scale, and features of one embodiment may be employed with other embodiments as those skilled in the art would recognize, even if not explicitly stated. Descriptions of well-known components and processing techniques may be omitted so as to not unnecessarily obscure the embodiments of the disclosure. The examples are intended merely to facilitate an understanding of ways in which the disclosure may be practiced and to further enable those skilled in the art to practice the embodiments of the disclosure. Accordingly, the examples and embodiments should not be construed as limiting the scope of the disclosure. Moreover, it is noted that like reference numerals represent similar parts throughout the several views of the drawings.

Following is a list of abbreviations used herein:
QSIM quantitative seismic integrated modeling
SRM surface related multiple
1D one dimension
2D two dimension
3D three dimension
AVO Amplitude variation with offset
GPU Graphic processing unit
GDE Geological Depositional Environment
CPU computer processing unit
MICP mercury injection capillary pressure
Q attenuation
QC Quality Control
VSP Vertical Velocity profiling
PZ summation Vertical/Z component and Pressure/P wave summation Subsurface modelling can be implemented in hydrocarbon exploration, development or production. Subsurface models can be generated based on sensor data that includes, for example, well log data, well test data, seismic data, production data, or any other data that can be used to model physical properties in one or more subsurface regions. The sensor data can include coordinate data or elevation data associated with, for example, well log data, well test data, seismic data or production data. The subsurface models can represent subsurface regions, including structures, cavities, faults, volumes, areas, material properties, or fluid properties. The subsurface models can represent measured data or interpreted data for each subsurface region. The subsurface models can represent material or fluid properties such as, for example, temperature, pressure, density, porosity, permeability, fluid content, volume, flow rate, or viscosity in the subsurface regions. The subsurface models can include, for example, geological models or reservoir models. The subsurface models can be employed in determining optimal placement of wells in the field.

Regarding seismic data, a seismic inversion process can be used to model a subsurface region and reconstruct or estimate material or fluid properties in the subsurface region. In seismic inversion, raw seismic data acquired during a survey may undergo a data interpretation process to obtain geological depth information, such as the seismic attributes for the region of interest. The seismic inversion process can include, for example, a full waveform inversion (FWI) process, which is a nonlinear data-fitting process. The seismic inversion process can be used to build a model of the subsurface region and iteratively update the model to minimize inconsistencies between recorded seismic sensor data and modeled seismic sensor data and other types of measured data and models. As further described herein the QSIM workflow can perform an inversion process that can combine seismic data and well log data to predict material or fluid properties in a subsurface region. As would be understood, well logs are generated by passing well logging tools through a well and capturing valuable measurements and information concerning the rock and fluid properties surrounding the well. Acquiring well log measurements can involve inserting a measurement tools in a borehole and can also involve obtaining core measurements, in which physical samples are retrieved from the subsurface region and inspected or measured.

Seismic inversion can remove imprints of wavelets in the seismic data, such as, for example, by deconvolution and conversion of results into impedance. For instance, inversion can include converting the data to a distribution of seismically-derived acoustic impedance over time or depth within the subsurface region. Acoustic impedance, which is a measure of the opposition of the flow of sound through a surface, can thus be used to interpret subterranean zones of interest, for example by estimating the location of subterranean boundaries and the thickness of a layer, zone, formation, reservoir, etc.

By way of overview and introduction, the present application describes a computer implemented quantitative seismic integrated modelling (QSIM) systems and workflow for integrating the one, two and three-dimensional (1D, 2D, 3D) data from different geoscience domains within a framework in order to produce hi-resolution geocellular models that simulate realistic sub-surface reservoir properties. The model can serve the objectives of multiple disciplines in the industry at once by predicting the elastically resolvable flow units of interest for reservoir engineers out of the reservoirs those comprised of sedimentological studies, to be used directly by the modeler. A salient aspect of this approach is that the one set of models can serve numerous objectives.

The exemplary QSIM systems and workflows are configured to accurately leverage the seismically derived reservoir rock properties after integrating all the geophysical, geological and engineering information through an optimum rock physics models that takes in consideration all the empirically constrained templates to correct, validate and quality check all input data.

QSIM is a multi-facet integrated modelling system that augments the way the subsurface environment is envisaged from a variety of field measurements and conceptual models. By adhering to a stern set of geophysical, geological and engineering data, the QSIM system is configured to generate more realistic geocellular models, thus establishing a platform for seamless cooperation between all upstream disciplines. The expansive array of stringent workflows implemented by the QSIM system are critical in delivering 3D static reservoir models using seismic-derived petrophysical and rock physical properties. Hence, the QSIM system is configured to resolve the spatial distribution of the reservoir, select the most effective combination of conventional and horizontal wells and detect bypassed economic hydrocarbon accumulations. The QSIM methodology implemented using the QSIM system was successfully applied in two oil fields, and attained favorable outcomes based on both production simulation and preferential well placement. The results displayed excellent seismically driven porosity prediction at the well locations. The porosity trends predicted from seismic significantly improved field history matching in both study fields.

With the advent of broadband and hi-channel seismic data acquisition, there is a sharp increase in the acquired data, and also in the resolution and image quality which facilitates advanced seismic integrated workflows. Using this data combined with extensive core-sedimentological expertise, the disclosed embodiments serves to bridge all the 1D, 2D and 3D extensive data domains and develop hi-resolution geocellular models for field development programs. The exemplary systems and methods for QSIM leverages seismically derived reservoir rock properties, after integrating all the geophysical, geological and engineering information through an optimum rock physics model. QSIM, takes in consideration all the empirically constrained templates to correct, validate and quality check all the input data. The proposed algorithms can be applied to any variety of multidimensional images or, in general, any multidimensional data plot, matrix, or tensor.

By way of background, traditional geocellular models are 3D and incorporate 1D, 2D data and to some extent 3D data, which mostly comprises of properties extracted from 3D seismic amplitude data. However, integrating seismic amplitude data to geocellular models for deriving accurate reservoir properties is one of the fundamental challenges in the industry. The challenge is due to data scale variations and predictability of reservoir properties. Current geocellular models and workflows have matured to the point where they can be used to understand, integrate, and exploit the 1D/2D data, however integrating 3D seismic data remains a technical challenge. The main challenges with existing workflows include:

The geophysical well logs are not conditioned specifically to work in the elastic domain for extracting reservoir properties from seismic amplitude data.

Before the seismic amplitude data can be used in geocellular models, it must be properly conditioned to derive the reservoir properties from the amplitude data. Hence, there is uncertainty how the seismic data is processed, which affects the end results.

The integration of sedimentary core facies is another bottleneck for upscaling them to the seismic scale or relating the facies with amplitude data. Numerous workflows do not address the integration of facies with amplitude data.

In complex geological areas, the seismic grids do not provide the best interpretation for internal reservoir geometry, which is commonly interpolated using only the well tops (e.g., formation tops in a well). This creates uncertainty and mismatch with upscaling depth converting seismic amplitude data into 3D geocellular grids.

Upscaling seismic data at normal acquired amplitude resolutions cannot address in resolving thin reservoirs or heterogenic geology, hence the final geocellular models are inadequate to calculate hydrocarbon pore and in place volumes.

Embodiments of the systems and methods for QSIM disclosed herein combine to provide a workflow that provides a consistent approach to address the above industry challenges and develop an integration system framework for combining 1D, 2D and 3D data from core facies to seismic amplitude data.

Figure 1B:
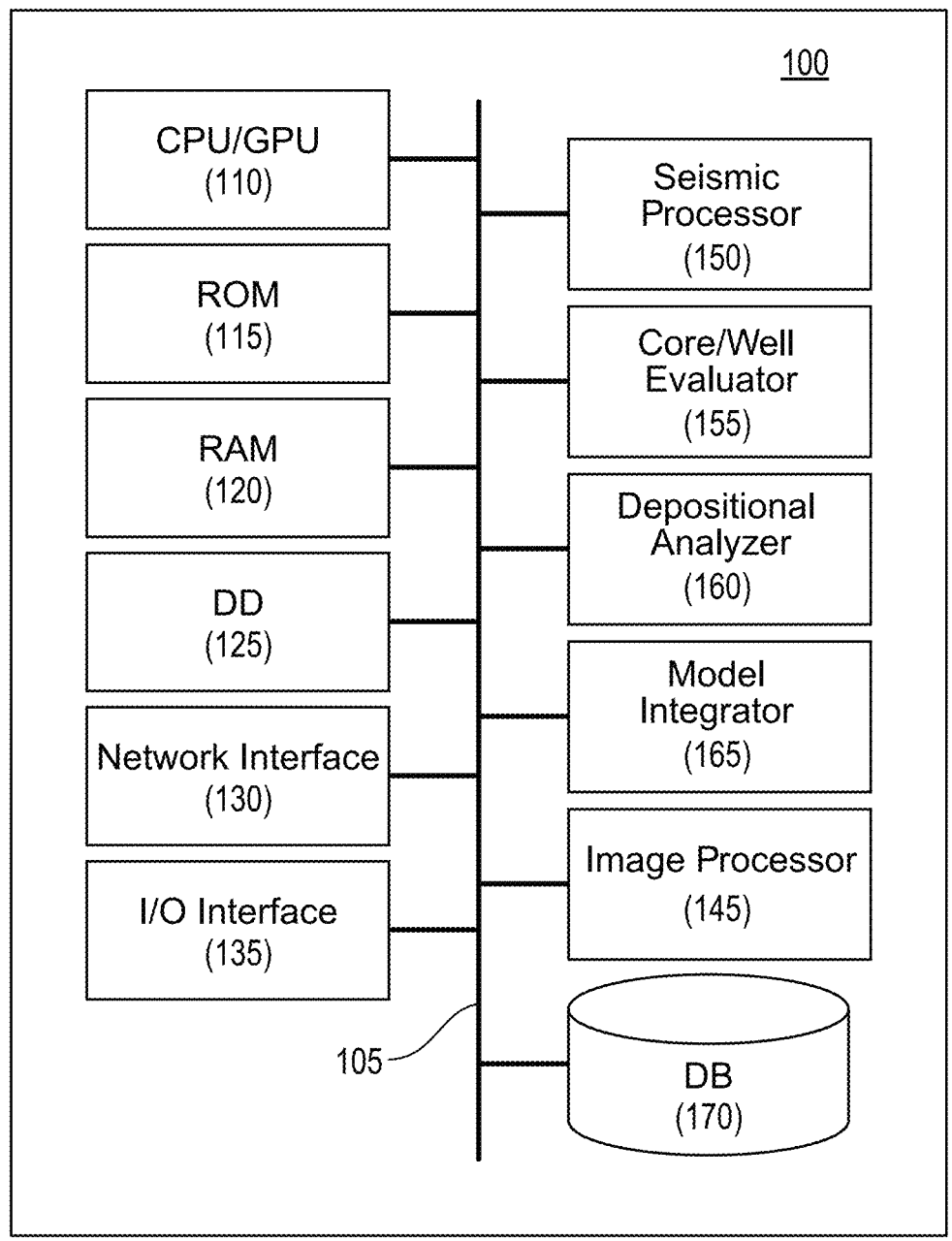
FIG. 1B shows an example of a modelling processor used in the QSIM system of FIG. 1A according to the principles of the disclosure.
Figure 1C:
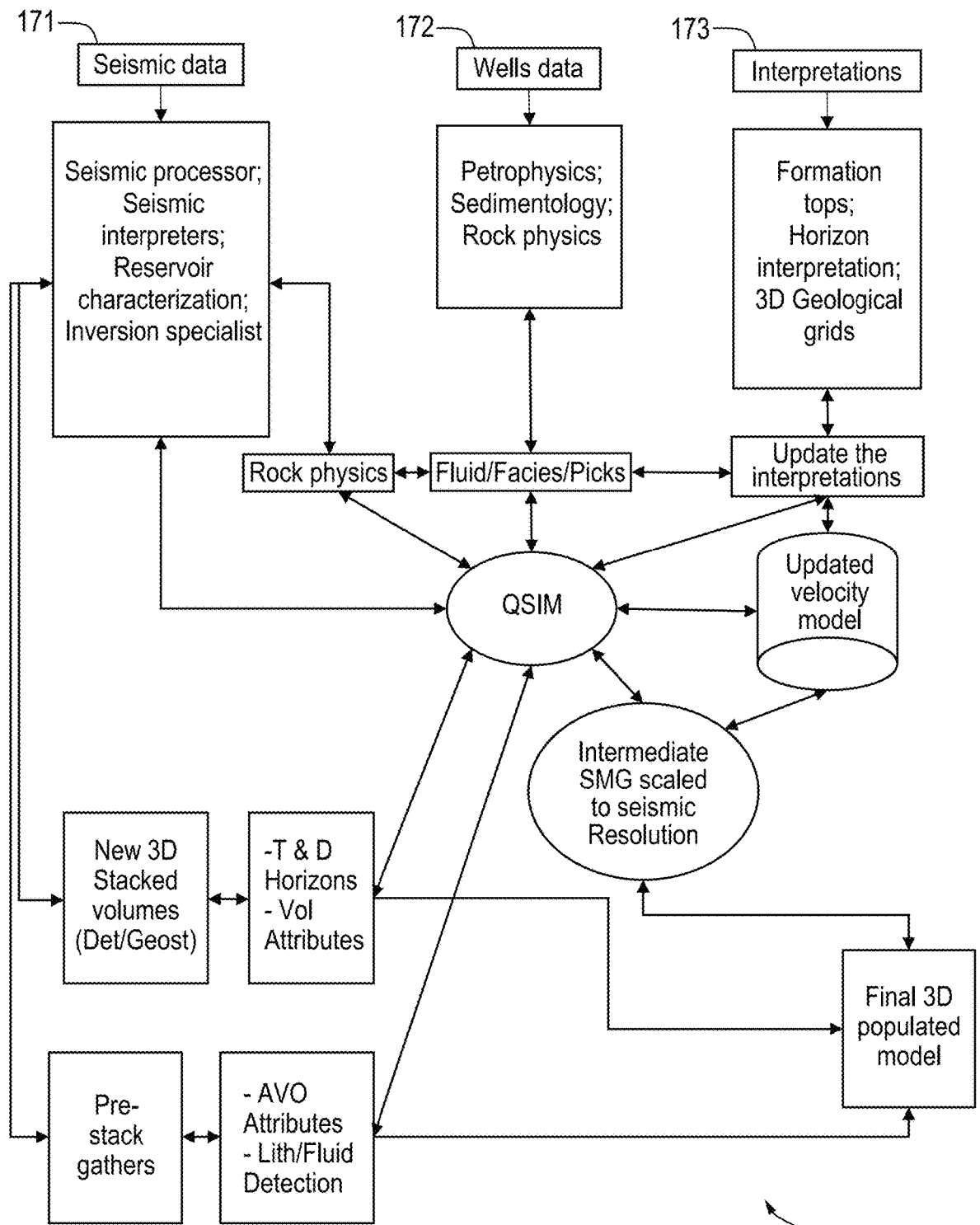
FIG. 1C is a high-level conceptual block diagram illustrating an exemplary configuration of functional blocks and operations of a QSIM workflow implemented by the QSIM system of FIG. 1A according to the principles of the disclosure.

FIG. 1A shows an example of a QSIM system 1, constructed according to the principles of the disclosure. FIG. 1B shows a non-limiting embodiment of a modelling processor 100 that can be included in the QSIM server 10 (shown in FIG. 1A). FIG. 1C is a conceptual system and process diagram illustrating the components and operations in the exemplary QSIM workflow implemented by the QSIM system 1. As shown in FIG. 1A, The QSIM system 1 includes a QSIM server 10 and a communicating device 20. The QSIM system 1 can include sensor equipment 30, an implementation tool 40, or a network 50. The various components in the QSIM system 1 can be communicatively coupled to each other directly via communication links 5, or via communication links 5 and the network 50.

The QSIM server 10 can include a QSIM processor 100 (shown in FIG. 1B). The QSIM server 10 can receive sensor data S1, S2, . . . Sm (where m is a positive integer greater than 2) directly or via the network 50 from land or marine seismic surveys that can be carried out using the sensor equipment 30. The received sensor data can include seismic data, well log data, well test data, production data, and other available data to model a subsurface region. The received sensor data can include pre-stack seismic data. The received sensor data can include coordinate data or elevation data. The received sensor data can include two-dimensional (2D) data, three-dimensional (3D) data, or four-dimensional (4D) data. The QSIM server 10 can filter raw sensor data from different types of noise that might exist in the received sensor data S1, S2, . . . Sm and generate one or more models for a subsurface region based on the raw sensor data. The model can include, for example, a geological model or a reservoir model. The QSIM server 10 can carry out a seismic-to-simulation process to construct the model, which can accurately reflect the original well log data, seismic data, well test data, or production data.

The QSIM server 10 can generate a seismic model based on the raw sensor data, which can include raw pre-stack seismic data. The QSIM server 10 can generate a geological model based on the seismic model. The QSIM server 10 can estimate one or more physical properties, such as, for example, porosity, permeability, density, temperature, pressure, viscosity, fluid content, fluid saturation, or flow rate in a target subsurface region.

The sensor equipment 30 can include transducer devices (not shown) that can generate and emit signals, including, for example, acoustic pulses, and receive reflected signals from a target area to form an image (for example, an ultrasound image) of the target area. Each transducer device (not shown) can include an energy source (for example, an ultrasound pulse generator and transmitter) and a receiver (for example, an ultrasound signal receiver). The sensor equipment 30 can include, for example, geophones, seismometers, or other wave energy emitting/sensing devices. The sensor equipment 30 can include arrays of transmitters or receivers.

The implementation tool 40 can include, for example, a drilling rig (not shown) or wellbore casing installation equipment (not shown) for drilling or casing boreholes. The implementation tool 40 can be fully automated. The implementation tool can include human control. The implementation tool 40 can be positioned at a geographic location based on coordinates determined by the QSIM server 10.

FIG. 1B shows an example of the modelling processor 100, constructed according to the principles of the disclosure. The processor 100 can receive sensor data S1, S2, . . . Sm. The processor 100 can output multiparameter attribute data A1, A2, . . . An (where n is a positive integer greater than 2, and where n can be the same as or different from m). The sensor data or attribute data can be received or transmitted over the communication link 5 (shown in FIG. 1A). The processor 100 can carry out a QSIM process shown in FIG. 1C and FIG. 5A to integrate the one, two and three-dimensional (1D, 2D, 3D) sensor data from different geoscience domains within a framework in order to produce hi-resolution geocellular models that simulate realistic subsurface reservoir properties.

FIG. 1B shows a non-limiting embodiment of a modelling processor 100 that can be included in the QSIM server 10 (shown in FIG. 1A). As seen in FIG. 1B, the processor 100 can include a computer processor 110 such as a computer processing unit (CPU), a read-only memory (ROM) 115, a random-access memory (RAM) 120, a disk drive (DD) 125, a network interface 130, an input/output (I/O) interface 135, an image processor driver 145, or a database (DB) 170. The various components in the processor 110 can be connected to a bus 105 via one or more communication links. The processor 100 can receive the sensor data S1, S2, . . . Sm via, for example, the network interface 130, I/O interface 135, DD 125, or the DB 170.

The system bus 105 can be any of several types of bus structures that can further interconnect to a memory bus (with or without a memory controller), a peripheral bus, and a local bus using any of a variety of commercially available bus architectures.

The CPU 110 can be any of various commercially available processors. Dual microprocessors and other multiprocessor architectures can also be employed as the CPU 110. The CPU 110 can also be a graphics processing unit (GPU).

The processor 100 includes a computer-readable medium that can hold executable or interpretable computer code (or instructions) that, when executed by the CPU 110, cause the described steps, processes and methods to be carried out. The computer-readable medium can be provided in the ROM 115, RAM 120, DD 125, DB 170, or an external computer-readable medium connected to the processor 100 via the network interface 130 or the I/O interface 135. The computer readable medium can include functional modules, for instance, sections of computer code that, when executed by the CPU 110 cause the steps of QSIM workflow (e.g., operations illustrated in FIG. 1C and the method 500 shown in FIG. 5A) to be carried out, and all other process steps described or contemplated in the description.

A basic input/output system (BIOS) can be stored in a non-volatile memory in the processor 100, such as, for example, the ROM 115. The ROM 115 can include a ROM, an erasable programmable read-only memory (EPROM), or an electrically erasable programmable read-only memory (EEPROM). The BIOS can contain the basic routines that help to transfer information between components within the processor 100, such as during start-up. The RAM 120 can include a high-speed RAM such as static RAM for caching data.

The disk drive (DD) 125 can include a hard drive, such as, for example, an enhanced integrated drive electronics (EIDE) drive, or a serial advanced technology attachments (SATA) drive. The DD 125 can include an optical disk drive that can read/write from/to a compact disk read-only memory (CD-ROM) disk (not shown), or read from or write to other high capacity optical media such as a digital video disk (DVD). The DD 125 can be configured for external use in a suitable chassis (not shown). The DD 125 can be connected to the system bus 105 by a hard disk drive interface (not shown) and an optical drive interface (not shown), respectively. The hard disk drive interface (not shown) can include a Universal Serial Bus (USB) (not shown) or an IEEE 1394 interface (not shown) for external applications.

The DD 125 and associated computer-readable media can provide nonvolatile storage of data, data structures, or computer-executable instructions. The DD 125 can accommodate the storage of any data in a suitable digital format. The DD 125 can include one or more apps that are used to execute aspects of the architecture described in this specification.

A number of program modules can be stored in the DD 125, ROM 115, or RAM 120, including an operating system (not shown), one or more application programs (not shown), other program modules (not shown), and program data (not shown). Any (or all) of the operating system, application programs, program modules, and program data can be cached in the RAM 120 as executable sections of computer code.

The network interface 130 can be connected to the network 50 (shown in FIG. 1A). The network interface 130 can include a wired or a wireless communication network interface (not shown) or a modem (not shown). When used in a local area network (LAN), the processor 100 can be connected to the LAN network through the wired or wireless communication network interface; and, when used in a wide area network (WAN), the processor 100 can be connected to the WAN network through the modem. The modem (not shown) can be internal or external and wired or wireless. The modem can be connected to the system bus 105 via, for example, a serial port interface (not shown).

The I/O interface 135 can receive commands and data from an operator via a user interface device (not shown), such as, for example, a keyboard (not shown), a mouse (not shown), a pointer (not shown), a microphone (not shown), a speaker (not shown), or a display (not shown). The received commands and data can be forward to the CPU 110 from the I/O interface 135 as instruction and data signals via the bus 105.

The image processor/driver 145 can include an image processing device, graphics driver (not shown), a video adaptor (not shown), or any other device necessary to process, generate and render an image signal on a display device, such as, for example the display device in the communicating device 20 (shown in FIG. 1A).

Also shown in FIG. 1B the processor 100 includes a seismic processor 150, core and well evaluator 155, depositional analyzer 160, model integrator 165, and image processor 145, which can each be a hardware-based device or a software module or a combination of the foregoing. It should be understood that one or more of the image processor, 145, seismic processor 150, core and well evaluator 155, depositional analyzer 160, or model integrator 165 can be integrated with the CPU 110 or provided separately, as seen in FIG. 1B. Furthermore, one or more of the image processor 145, seismic processor 150, core and well evaluator 155, depositional analyzer 160, or model integrator 165 can be in the form of instructions stored on one of the computer readable storage mediums and executable in the CPU.

FIG. 1C is a high-level conceptual diagram illustrating the interrelationship between various components of the QSIM system 1, operations performed in accordance with the QSIM workflow 500 and various data elements used or generated in accordance with the various operations described herein. As shown in FIG. 1C, inputs to the QSIM system and workflow include seismic data 171, wells data 172 and interpretations 173. It should be understood that the operations of the QSIM workflow described herein are executed using the QSIM system 1 and, more particularly, by a processor of the server 10. Some abbreviations noted in FIG. 1C include SMG—Solid Model Grid; T&D—time and depth horizons; Vol—Volume Attributes—basically Seismic Volume Attributes; Picks—Well Tops, Markers, Zonations; Lith/Fluid—Lithology & Fluid Detection; Inversion Specialist—Seismic Inversion geophysicist.

Generally, the QSIM workflow starts with mapping out all the available data to build the final model. All 1D, 2D, and 3D data acquisition, processing and interpretation time frames are mapped, optionally with peer-review, for integration of data with different data sets. Then, a subset of "key wells" are selected. For instance, data from wells with deviation of less than 35% can be selected, wherein deviation refers to angle of the drilled wells and well parameters relating to deviation can include Azimuth and Inclination. Key well measurements are used for tying the key well data with the seismic data. For instance, the measures of long sections of density, compressional slowness, resistivity can be selected for the given wells for the seismic-to-well tie work-step.

Incorporating QSIM as a mechanism for utilizing seismic data preferably also involves a comprehensive evaluation of amplitude data added to the start of the project. In particular, the QSIM system is configured to evaluate the seismic amplitude data at the key wells to determine the preservation or deterioration of amplitude variation with offset (AVO). In geophysics and reflection seismology, AVO is the general term for referring to the dependency of the seismic attribute, amplitude, with the distance between the source and receiver (the offset).

Variation in seismic amplitude due to the change in distance between source and receiver is related to changes in the subsurface physical properties for example lithologies and fluid content above and below the interface between successive reservoir units, wherein each reservoir unit or member is defined as porous stratigraphic rock layer comprising the sedimentological formation. This information is crucial for pre-stack inversion techniques to model the rock properties.

The correct AVO response of the processed gather data should reasonably match the modelled gather at the selected key wells, for this the following steps can be taken:
- Few key wells selected based on log extend, deviation, availability of required elastic logs (mainly compressional, shear Sonics, density and resistivity at least), and the selection also should reasonably cover the field under investigation geographically;
- Generate synthetic seismic gather using wavelets estimated from original input seismic data, convolved with the reflectivity calculated from the elastic well logs;
- Compare the calculated AVO response from the model gather with the processed recorded gather.

As understood in the art, a gather is a collection of seismic traces which share a common geometric attribute. The term "gather" usually refers to a common image point (CIP) or common mid-point (CMP) gather. Gathers are sorted from field records in order to examine the dependence of amplitude, signal to noise, move-out, frequency content, phase, and other seismic attributes, on offset, incidence angle, azimuth, and other geometric attributes that are important for data processing and imaging.

If the determined AVO does not meet required specifications mentioned above, re-processing is performed. Re-processing can preferably be performed in a pre-stack domain. Recommended, pre-stack pre-processing operations can include, but is not limited to: Denoising and quality control (QC) of seismic amplitude data; Near surface & residual statics QC;

Summation; Deconvolution; Surface Consistent Amplitude Correction; De-multiple (Multiple Attenuation); Interpolation and Pre-Migration Condition; Pre-Stack Time Migration; Gather Conditioning; and 3D volume stacking.

Additionally, the QSIM system is configured to evaluate the reprocessed seismic data at the key wells to evaluate the AVO response at the reservoir intervals. If the results are unsatisfactory, further seismic conditioning workflows can be implemented. The reservoirs intervals are the layers or beds in the subterranean formation from which the hydrocarbon can be produced in exploitable quantities.

The QSIM system and workflow also preferably integrates Reservoir Petrophysics. Reservoir Petrophysics is recommended and, in this regard, the QSIM system is configured to evaluate all cored versus non-cored wells to develop consistent porosity, mineral volume and saturation models. Furthermore, the QSIM system is further configured to integrate petrophysics deliverables with rock physics principals to ensure that the rock acoustic response is correctly predicting the computed porosity, volume and saturation dynamics. The petrophysics deliverables include mineral volumes, porosity, water saturation and measured elastic data logs ("elastic logs"). All the petrophysical properties are checked for quality control in the Rock Physics domain to make sure that the properties are consistent well by well over the whole study area. For example, different rock physics attributes are computed using elastic logs and then cross plotted using different petrophysical attributes e.g. water saturation, porosity etc. to validate the data.

Figure 2A:
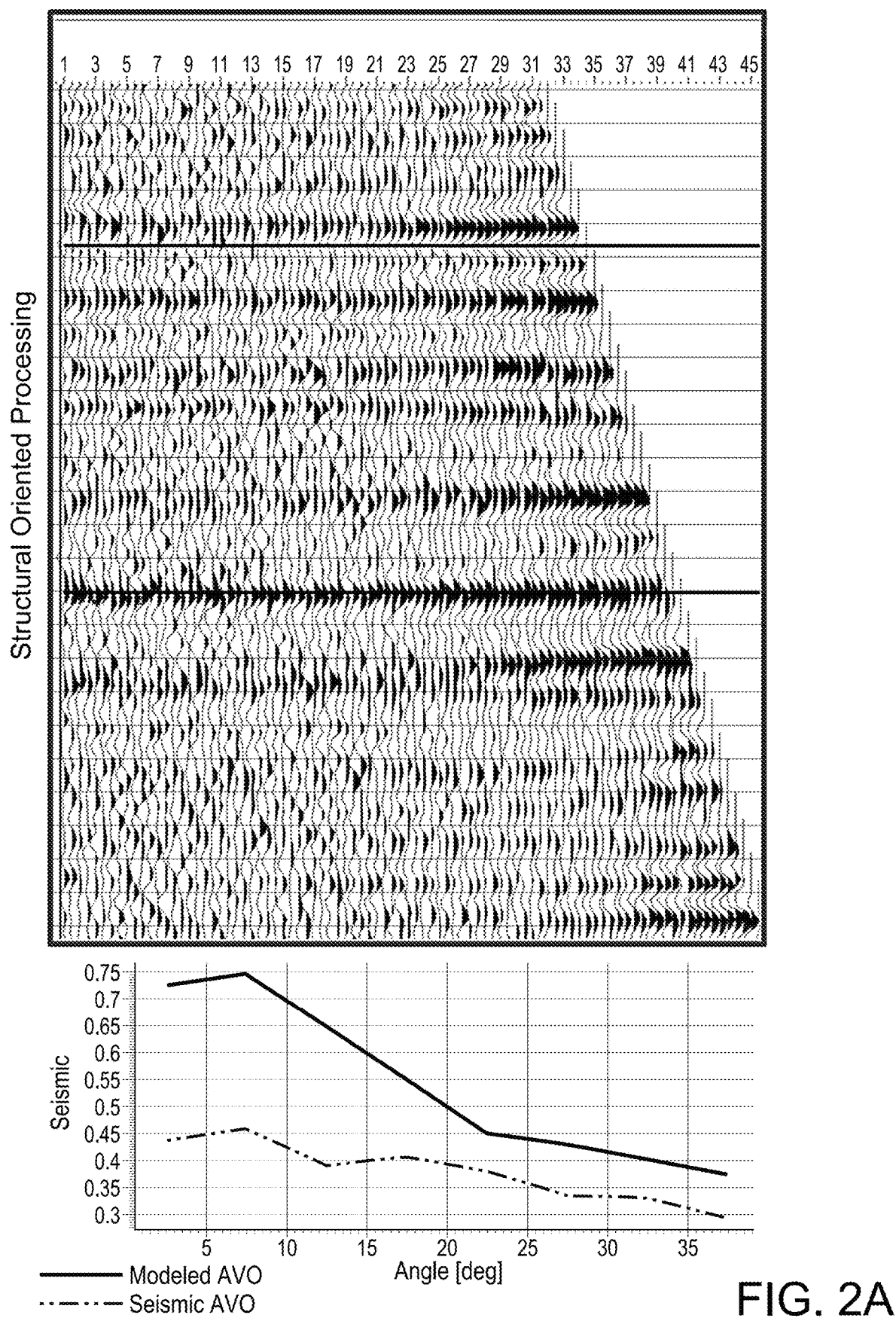
FIG. 2A illustrates an output of conventional structural-oriented processing systems.
Figure 2B:
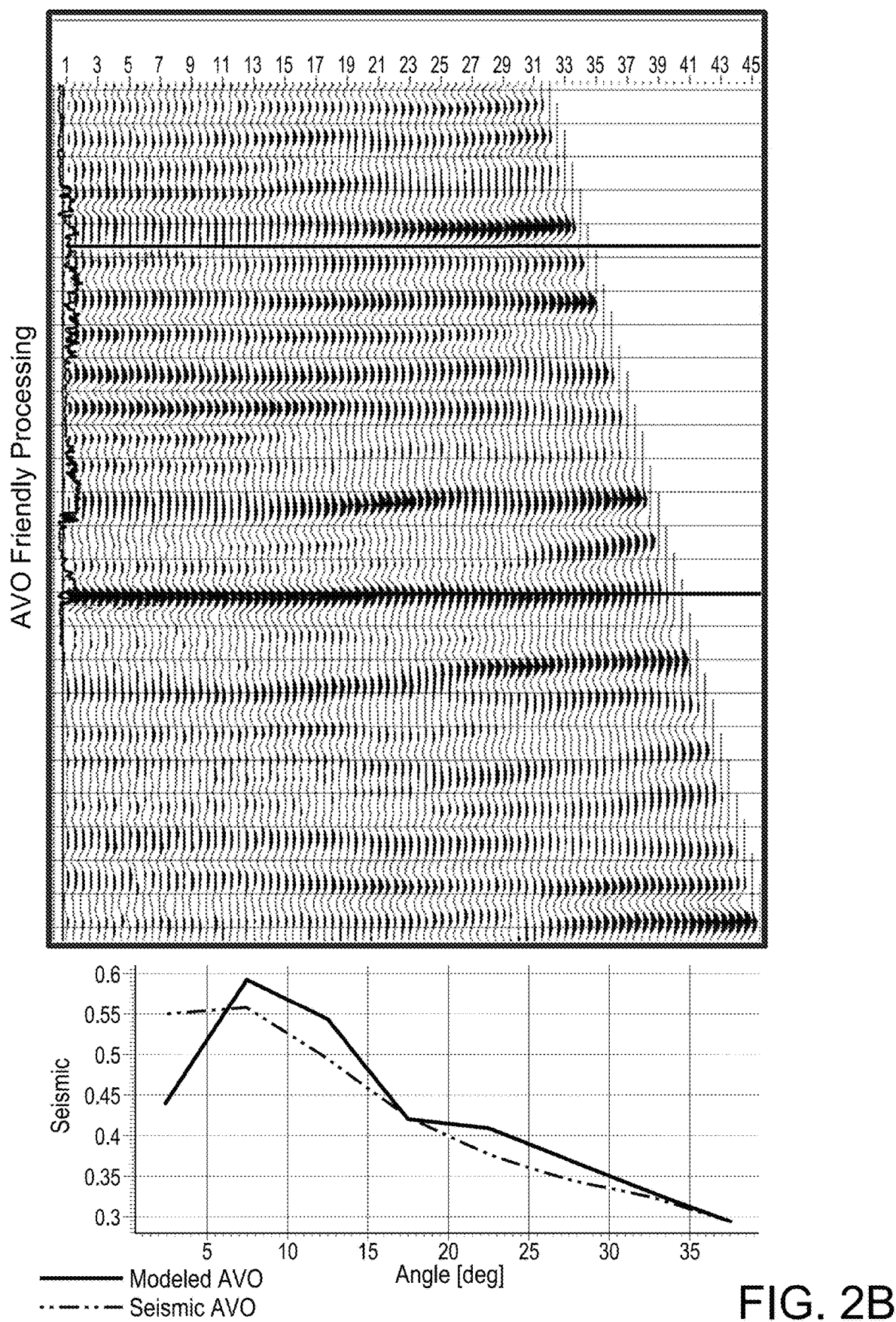
FIG. 2B illustrates an output of the QSIM workflow according to an embodiment.

According to a salient aspect, using various 1D, 2D and 3D measurements taken at discrete locations in and around the subsurface region of interest, the QSIM systems and methods are capable of generating accurate, high-resolution 1D, 2D and 3D visualizations throughout the entire region. FIG. 2B, illustrates an exemplary output of the exemplary QSIM system implementing the QSIM workflow highlighting the difference between the output of a conventional, structural-oriented processing system (shown in FIG. 2A) and the QSIM workflow incorporating AVO-friendly processing. Additionally, FIG. 2B shows the improvement retained by using the QSIM reprocessing steps, that are controlled by intensive QC and validation, at each stage of the process. The QSIM system is configured to iterate until reaching the best possible seismic quality, which preserves the true amplitude, and the amplitude variation with offset, as shown in the graphs at the bottom of each gather, and also have high Signal to Noise ratio as compared to the conventional processing.

Figure 3:
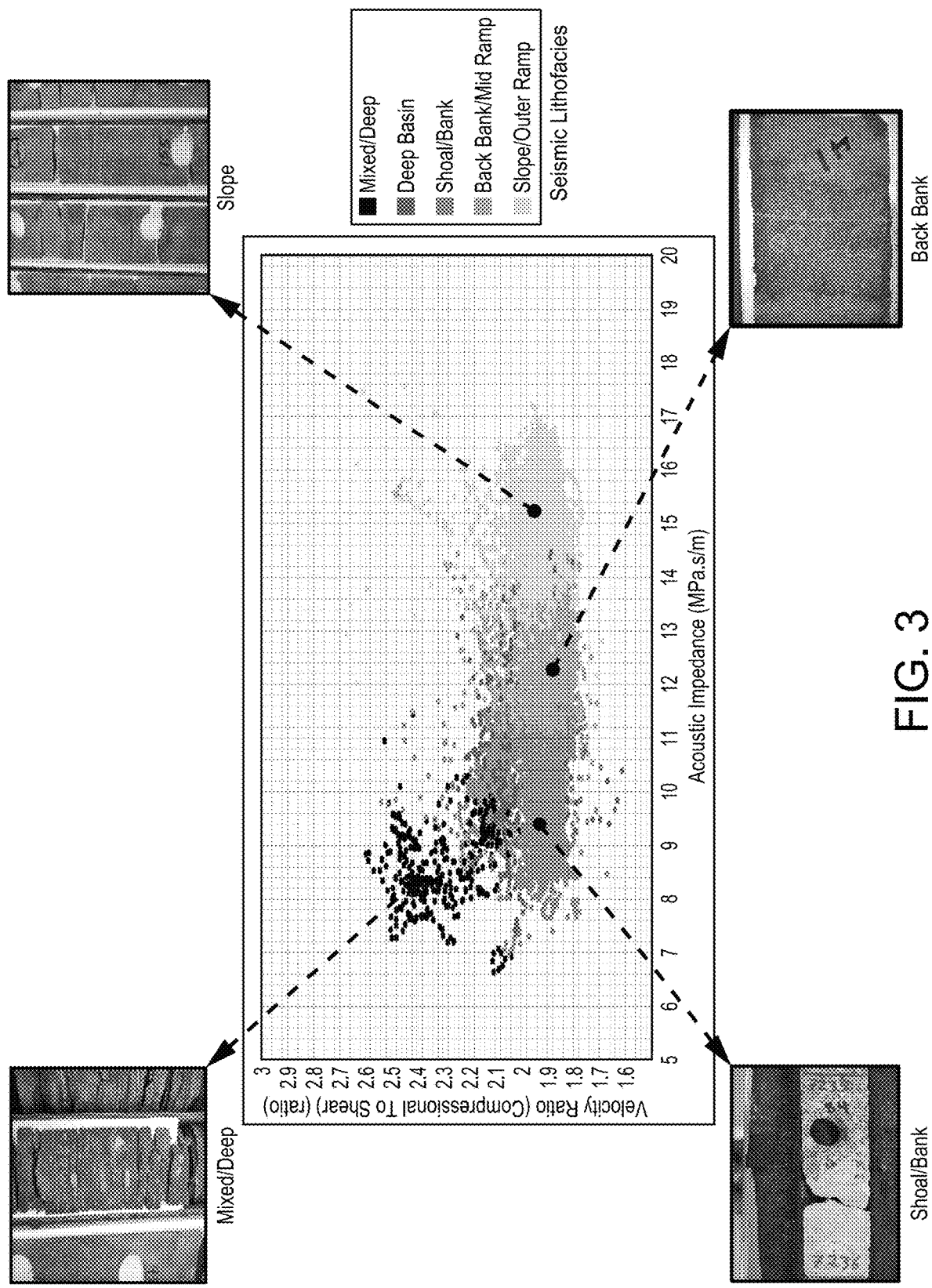
FIG. 3 illustrates a cross plot of acoustic impedance (AI) and Velocity ratio (VPVS) data points color coded by different elastic facies according to the principles of the disclosure.

FIG. 3 illustrates a scatter-plot of data points generated in accordance with the proposed QSIM workflow. In particular, the graph illustrates velocity ratio vs. acoustic impedance data points captured for various seismic lithofacies including mixed/deep, deep basis, shoal/bank, back bank/mid ramp and slope/outer ramp. FIG. 3 shows a cross plot of acoustic impedance (AI) and velocity ratio (VPVS) color coded by different elastic facies. As shown, four out of five elastic facies are clearly lumped in distinctive lump that can be mapped using the two elastic attributes. The name of the facies, its core image, with its clustering in elastic domain is also shown.

Figure 4A:
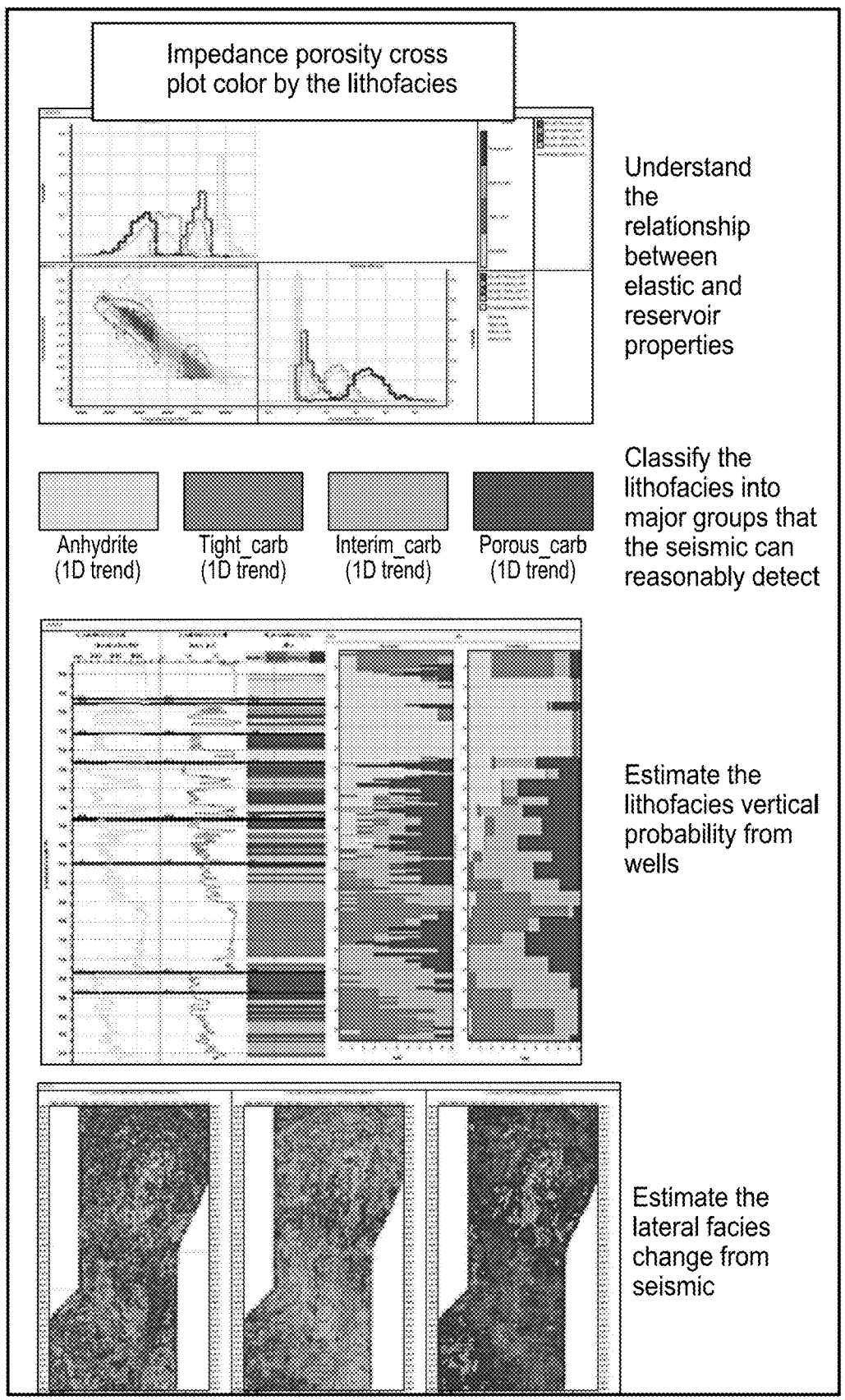
FIGS. 4A-4B are screenshots of a graphical user interface illustrating visualizations of the data as processed at key steps performed by the QSIM system implementing the QSIM workflow according to the principles of the disclosure.
Figure 4B:
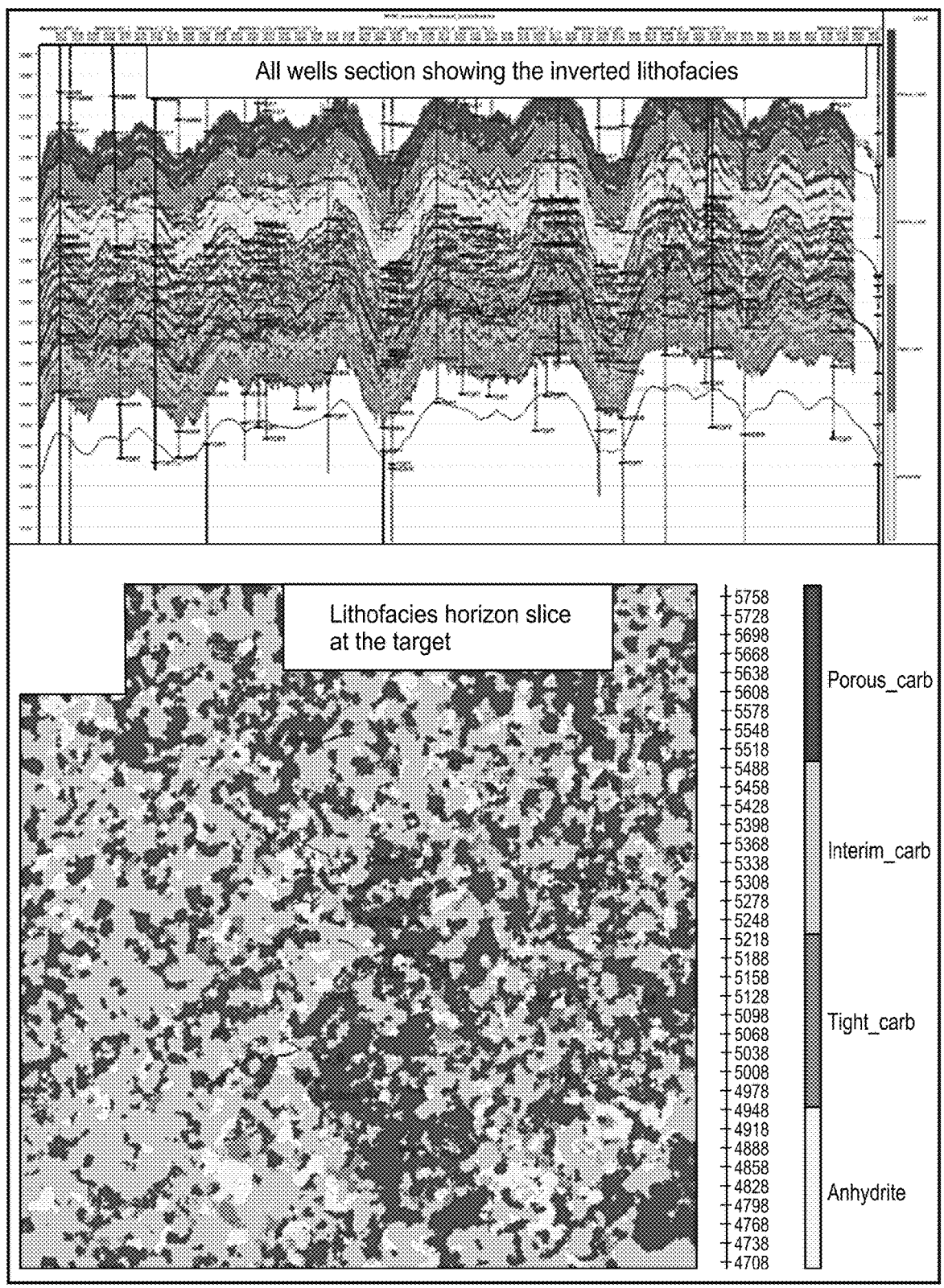
Figure 4C:
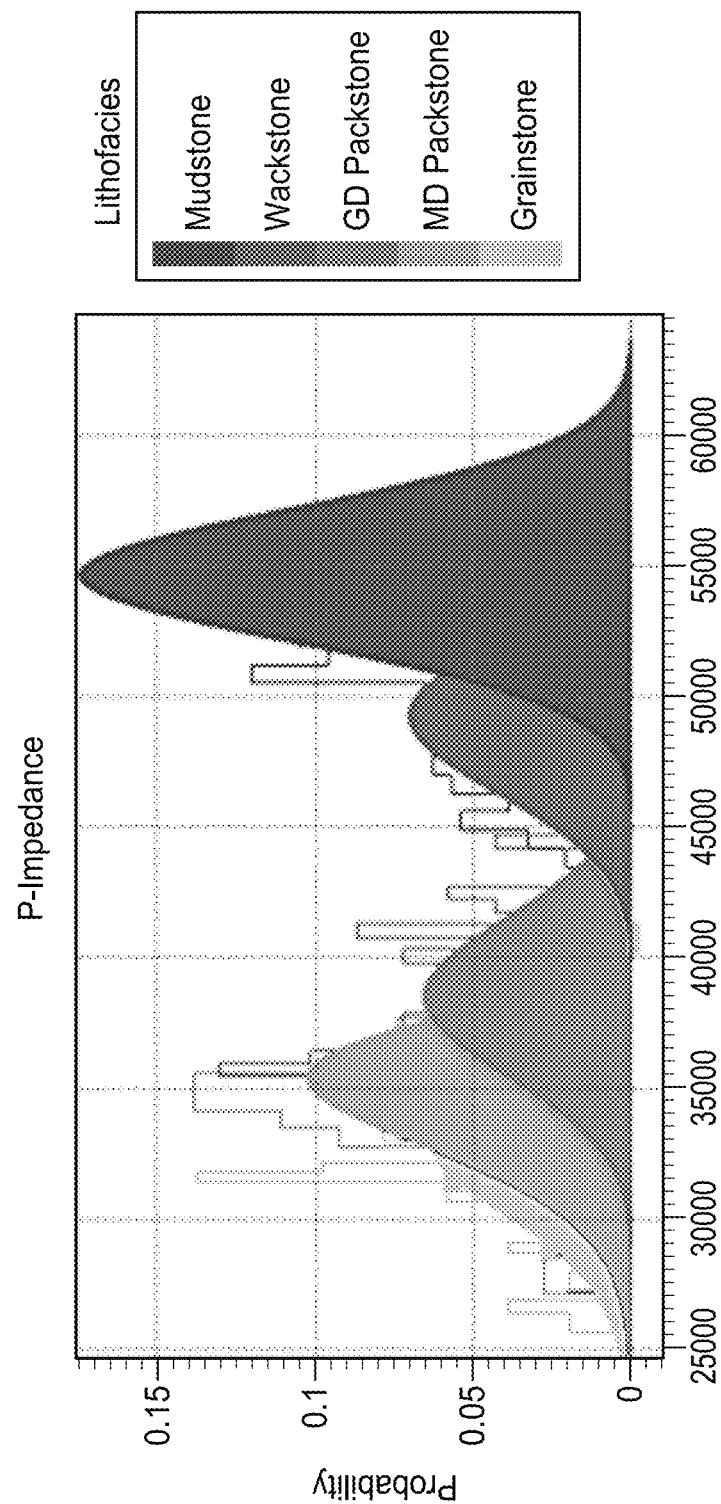
FIGS. 4C-4E are screenshots of a graphical user interface illustrating visualizations of the data as processed by integration of geological information with elastic facies according to the principles of the disclosure.
Figure 4D:
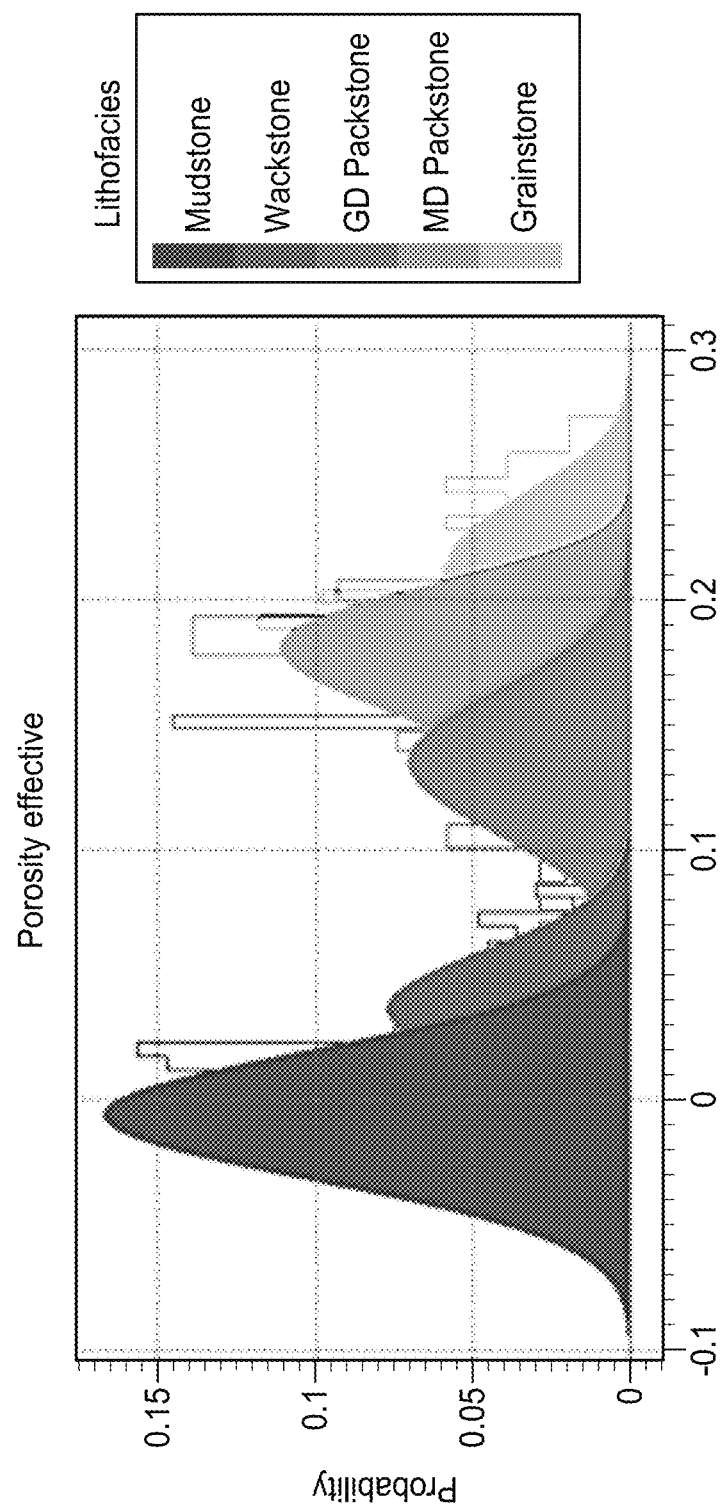
Figure 4E:
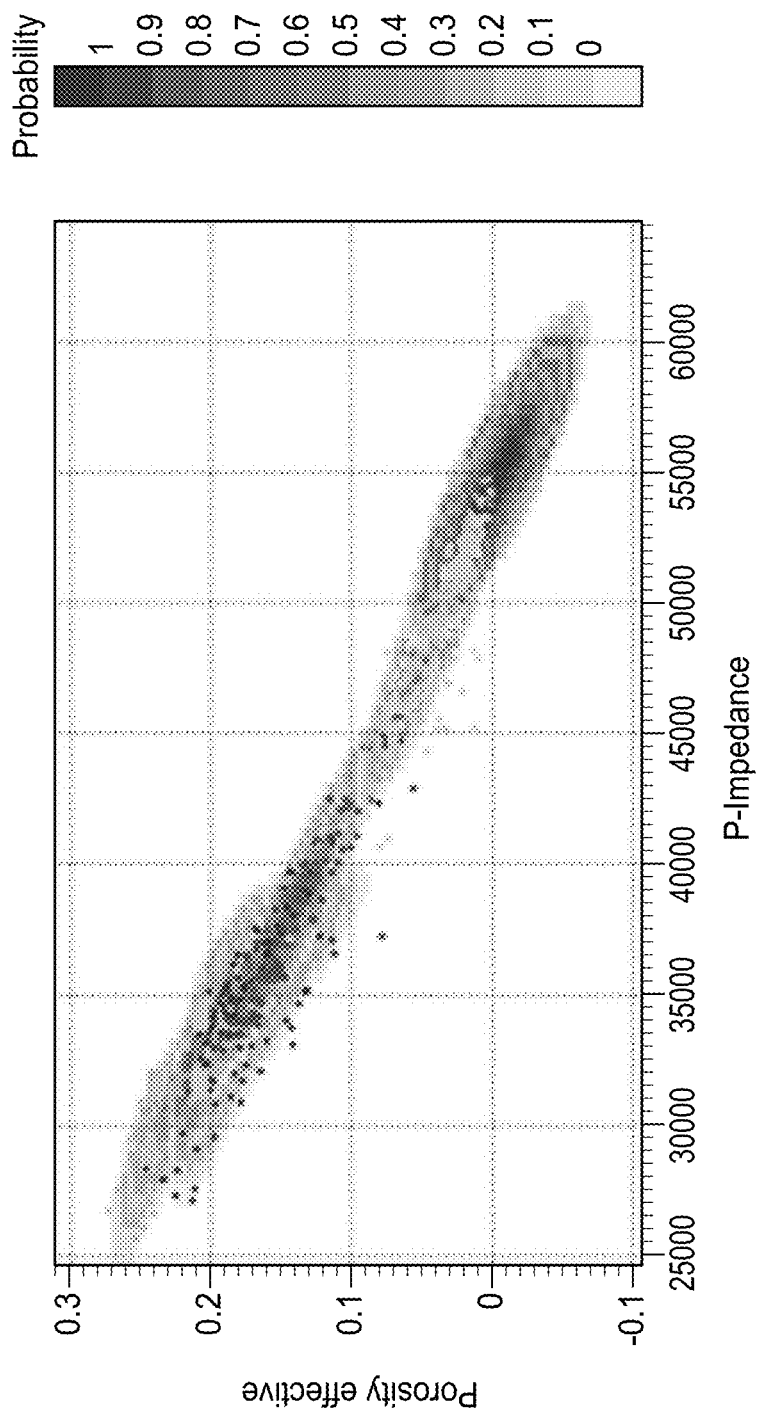
Figure 4F:
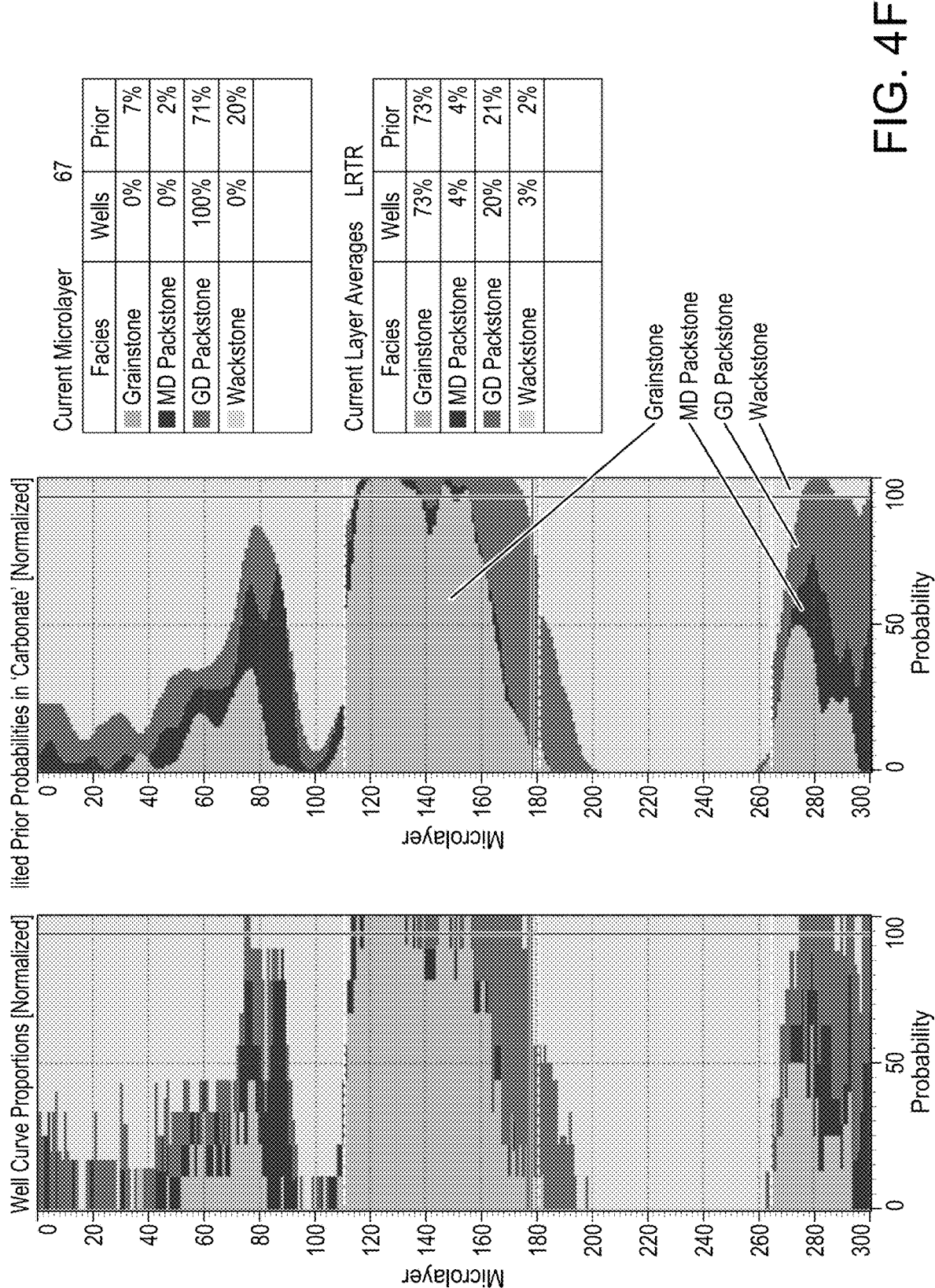
FIG. 4F illustrates visualizations of data showing the vertical probability of each facies calculated from the wells according to the principles of the disclosure.
Figure 4G:
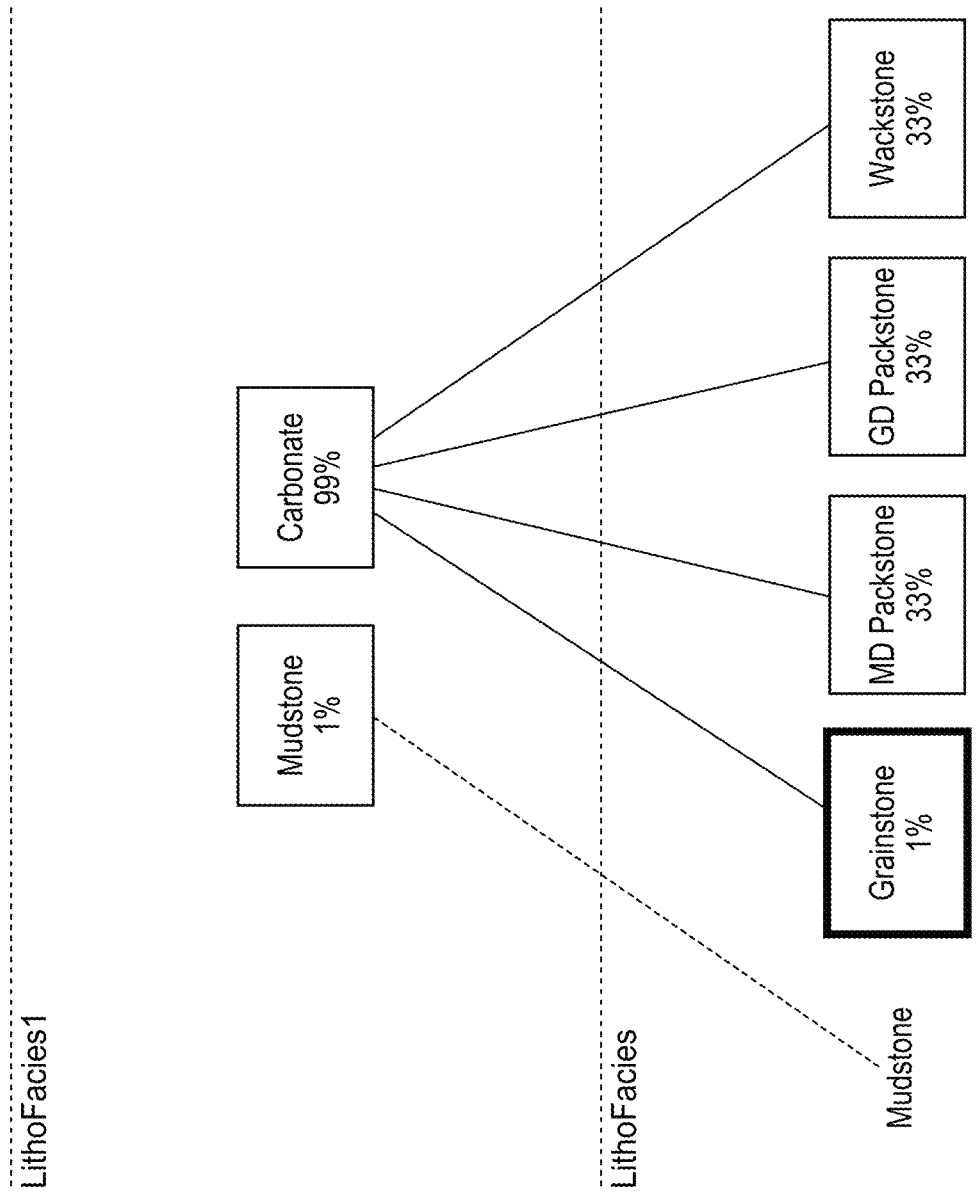
FIG. 4G is a schematic diagram showing the schematic facies nesting according to the principles of the disclosure.
Figure 4H:
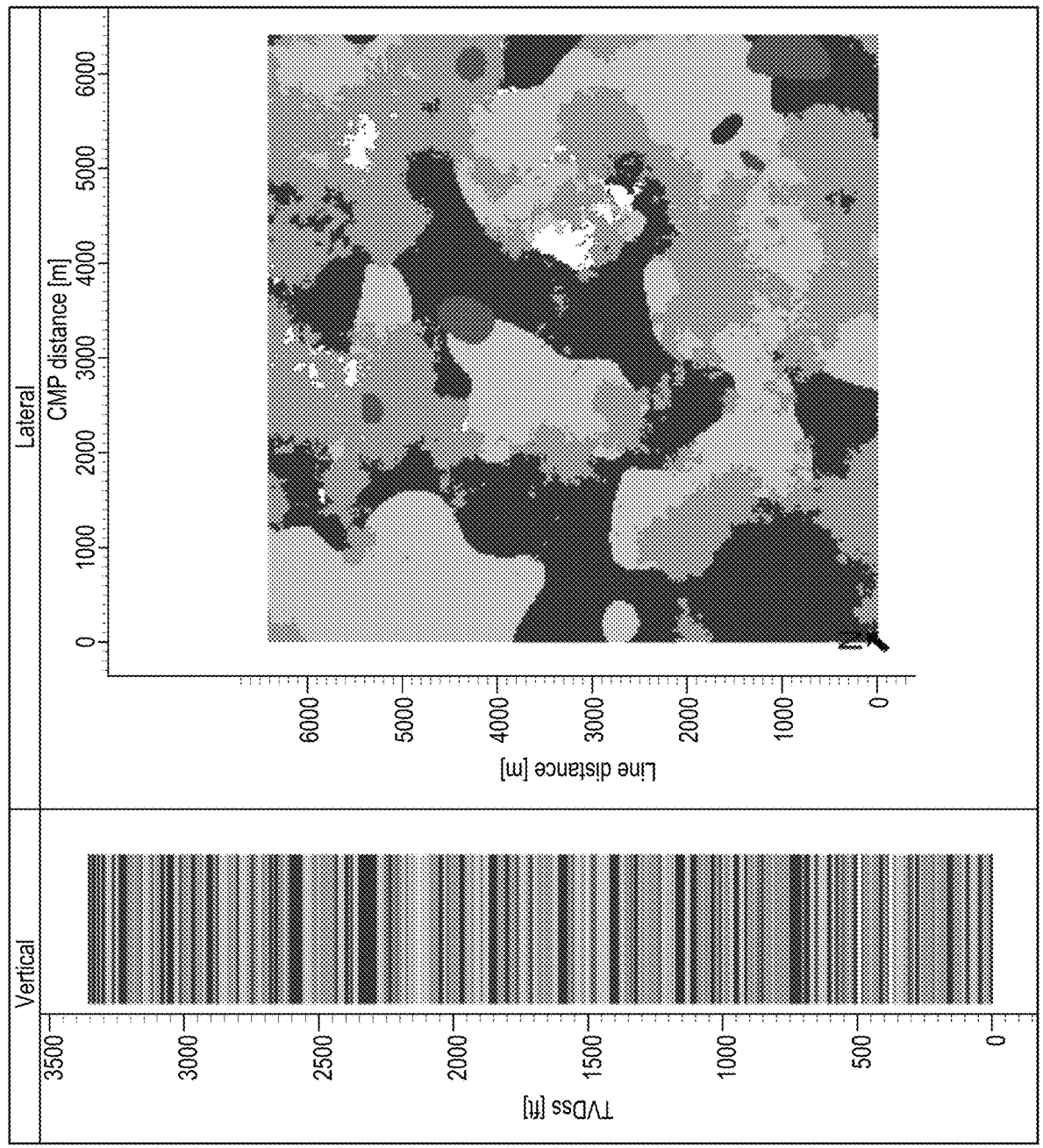
FIG. 4H is a visualization of a 2D simulation performed using geostatistical parameterization according to the principles of the disclosure.

FIGS. 4A-4B are screenshots of a graphical user interface illustrating visualizations of the data as processed at key steps of the proposed QSIM workflow. FIG. 4C-4E are screenshots of a graphical user interface illustrating the integration of the geological information with the elastic facies through estimating the probability density function of each of the facies as indicted by the elastic properties. FIG. 4F shows the vertical probability of each facies calculated from the wells. FIG. 4G shows the schematic facies nesting. FIG. 4H shows the 2D simulation using all the above described geostatistical parameterization.

Figure 5A:
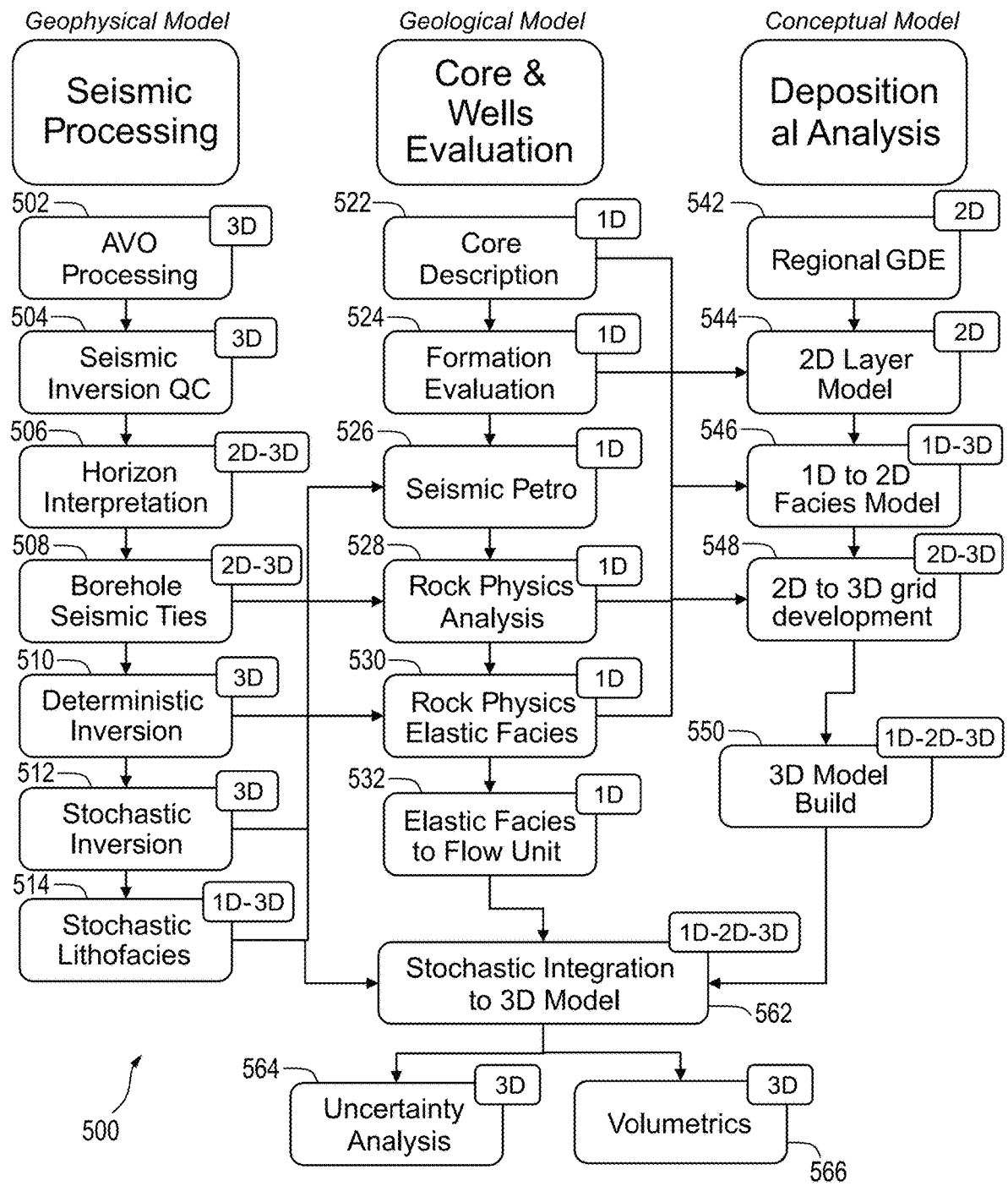
FIG. 5A is a flow diagram illustrating an exemplary QSIM workflow according to the principles of the disclosure.

FIG. 5A provides a more detailed flow diagram illustrating the steps of the QSIM workflow 500 performed by the QSIM processor 100 of the QSIM system 1 in accordance with one or more of the disclosed embodiments. FIGS. 5B-5E depict subroutines that comprise the QSIM workflow 500, particularly: the geophysical modeling steps (FIG. 5B), which are performed by the seismic processor 150; geological modelling steps (FIG. 5C), which are performed by the core/well evaluator 155; conceptual modelling steps (FIG. 5D), performed by the depositional analyzer 160; and model integration steps (FIG. 5E), which are performed by the model integrator 165.

QSIM considers and integrates three major domains of models and they are spread in 1D, 2D, 3D formats, namely, geological models, geophysical models and conceptual models. The list below reflects salient steps in the QSIM workflow, each categorized based on the number of dimensions of the data utilized in connection with the step (1D-2D-3D):

1. Seismic Processing for AVO preservation (3D) (FIG. 5A Blocks 502-514)
2. Seismic Processing to Seismic Inversion Integration (3D) (FIG. 5A Block 502)
3. Seismic Structural Interpretation (3D) (FIG. 5A Block 506)
4. Seismic Velocity Modeling for time to depth conversion (3D) (FIG. 5A Block 506-528-548-550)
5. Surface Seismic to borehole seismic integration for optimal ties (2D-3D) (FIG. 5A Block 508)
6. Core Description & facies classification (1D) (FIG. 5A Block 522-524)
7. Reservoir Petrophysics for optimal reservoir properties (1D) (FIG. 5A Block 524)
8. Seismic Petrophysics for optimal well to seismic well ties (1D) (FIG. 5A Block 528)
9. Core facies to log facies integration (1D) (FIG. 5A Block 522-524)
10. Rock Physics Analysis (1D) (FIG. 5A Block 528)
11. Rock Physics Elastic Facies—Upscaling of Core Facies for Seismic Integration (1D) (FIG. 5A Block 530)
12. Rock Physics Elastic facies—development of Rock Flow units—MICP integration (1D) (FIG. 5A Block 532)
13. Seismic Deterministic Inversion and Porosity Volume Generation (3D) (FIG. 5A Block 510 and 530)
14. Geological Layer Conformable Modeling with wells only (2D) (FIG. 5A Block 544)
15. Geological Layers conversion to time for integration with seismic inversion (2D-3D) (FIG. 5A Block 506 and 544)
16. Geological Layers integration with Geocellular modeling (2D-3D) (FIG. 5A Block 548)
17. Development of geocellular models with wells only (1D-2D-3D) (FIG. 5A Block 550)
18. Integration of Deterministic Inversion with Geocellular Models (1D-2D-3D) (FIG. 5A Block 510-530-548-550)
19. Hi-Resolution Stochastic Seismic Inversion using wells and seismic (1D-2D-3D) (FIG. 5A Block 512)
20. Probabilistic Analysis of Stochastic Seismic Realizations & Rankings (1D-2D-3D) (FIG. 5A Block 512-514)
21. Integration of Probabilistic Ranking with Geocellular Models (1D-2D-3D) (FIG. 5A Block 562)
22. Probabilistic Volumetric Analysis & Ranking for Field Development Plan (1D-2D-3D) (FIG. 5A Block 564-566)

Geophysical Modelling/Seismic Processing Subroutine

Figure 5B:
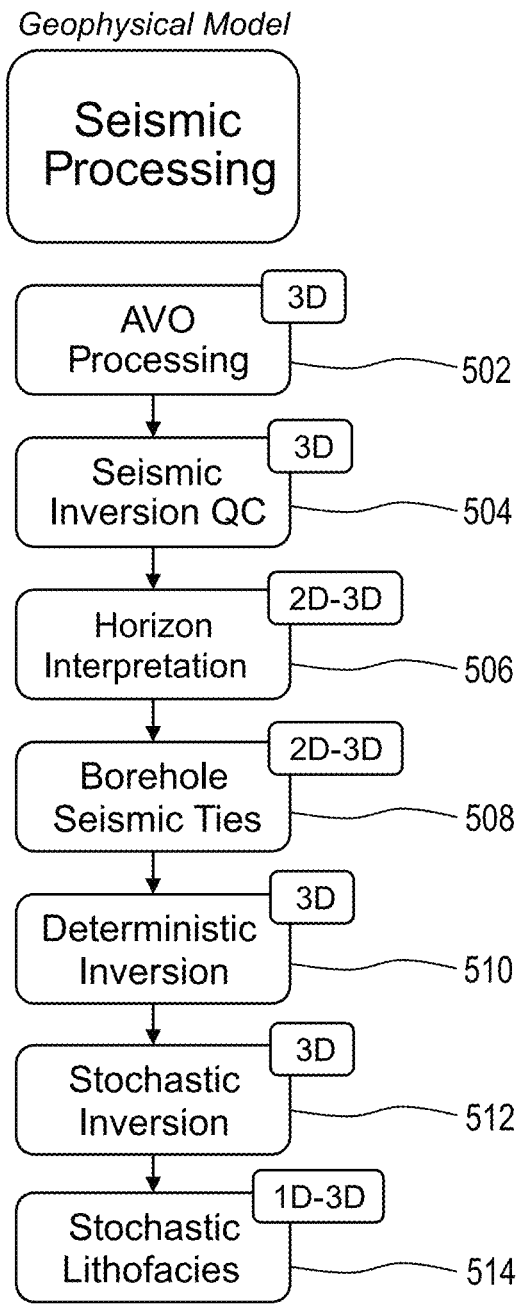
FIG. 5B is a flow diagram illustrating a subroutine of the exemplary QSIM workflow of FIG. 5A according to the principles of the disclosure.
Figure 5C:
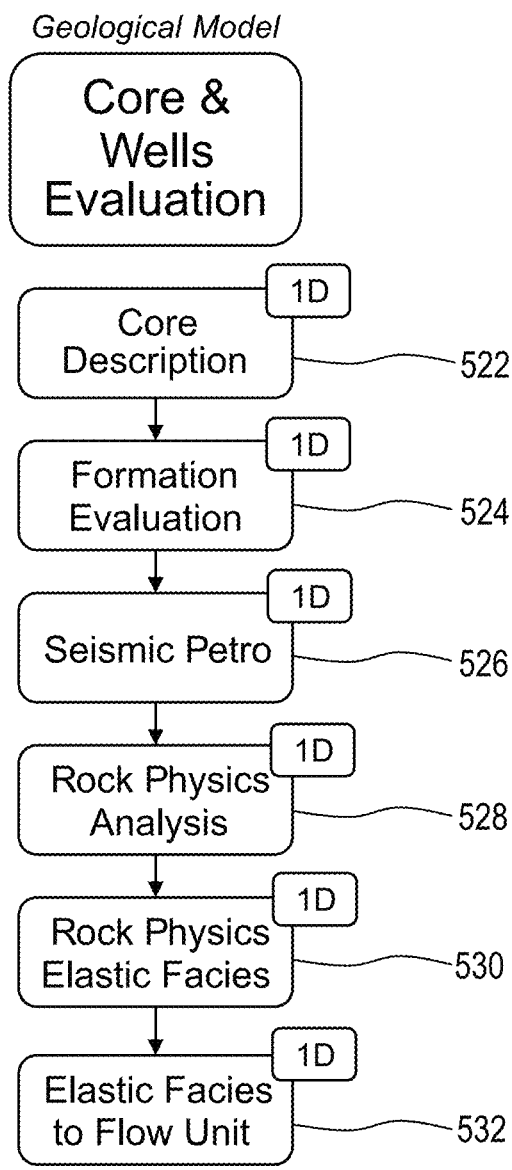
FIG. 5C is a flow diagram illustrating a subroutine of the exemplary QSIM workflow of FIG. 5A according to the principles of the disclosure.

The geophysical modelling steps can be performed by the processor 100 of the QSIM system server 10, which is configured by executing one or more of the modules including, for example and without limitation, the seismic processor 150. As shown in FIG. 5B, the geophysical modelling steps involve seismic data processing. Particularly the subroutine includes the steps of AVO Processing (502); Seismic Inversion QC (504); Horizon Interpretation (506); Borehole Seismic Ties (508); Deterministic Inversion (510); Stochastic Inversion (512); Stochastic Lithofacies (514). Each of these steps are described in greater detail below.

AVO Processing (502)

The seismic amplitude data is preferably adjusted in order to compensate for spherical spreading and transmission losses of the seismic signals. Deterministic pre-stack scaling methods can often be preferred over data adaptive scaling methods. In case adaptive techniques are required, their effects on the data are preferably carefully evaluated. Salient seismic processing steps include phase conversion and de-absorption, application of inverse Q to stabilize the wavelet, coherent noise attenuation, PZ summation (in case of transition areas), special and temporal resampling, multiple attenuation and surface consistent amplitude recovery and regularization.

Seismic Inversion QC (504)

Seismic inversion is used as a quality check for the seismic processing workflow. After each major step, the processed seismic data undergoes a full conditioning workflow. This can include changing one or more parameters in a series of processing steps, wherein the system changes only one parameter at a time. After each change, the system then will invert and compare the predicted elastic property after each step. If the step improves the correlation to the actual recorded data then the step is approved else, the system will modify and iterate until all the processing steps are finalized.

Borehole Seismic Ties (508)

Together with the inversion QC, borehole seismic and synthetic seismograms generated by convolving the wavelet with the well reflectivity are also used to QC the processed seismic mainly during the well to seismic tie. This step can be conducted by comparing the zero offset VSP corridor stacked trace to the actual seismic and synthetic traces. The correlations and signal to noise are calculated to numerically evaluate the progress towards higher values, once no more added value is observed the process claims to be completed.

As understood by those of ordinary skill in the art, a synthetic seismogram is the result of forward modelling the seismic response of an input earth model, which is defined in terms of 1D, 2D or 3D variations in physical properties. In hydrocarbon exploration this is used to provide a 'tie' between changes in rock properties in a borehole and seismic reflection data at the same location. It can also be used either to test possible interpretation models for 2D and 3D seismic data or to model the response of the predicted geology as an aid to planning a seismic reflection survey.

Horizon Interpretation (506)

In geology, a horizon refers to either a bedding surface where there is marked change in the lithology within a sequence of sedimentary or volcanic rocks, or a distinctive layer or thin bed with a characteristic lithology or fossil content within a sequence. In the interpretation of seismic reflection data, horizons are the reflectors (or seismic events) picked on individual profiles. These reflectors represent a change in rock properties across a boundary between two layers of rock, particularly seismic velocity and density.

In the Horizon Interpretation (506) step, using the result of step 504, the horizons are interpreted in an iterative mode using series of updated P-Impedance cubes. Then the input wells, wavelets and final horizons are inverted deterministically.

The inverted cubes coming from deterministic seismic inversion is used to further constrain the stochastic seismic inversion together with other geological constraints; this is done by using the signal to noise averages calculated from the inversion signal to noise maps and the probabilities of lithologies predicted from the seismic as prior proportions in 3D sense.

As shown in FIG. 5A, the result of the each of the Borehole Seismic Ties (508), Deterministic Inversion (510), Stochastic Inversion (512) and Stochastic Lithofacies (514) steps can be provided as an input to the Seismic Petro (526), Rock Physics Analysis (528) and Rock Physics Elastic Facies (530) steps of the Geological Modeling subroutine, as well as the Integration to 3D Model (562) steps further described herein. Deterministic Inversion (510) is the non-changing process of transforming the seismic reflection data into reservoir rock-properties without random ness involvement, using constraint derived from input data to overcome the non-uniqueness of the solution so the answer is one model. Stochastic Inversion (512) involves randomness and the result has uncertainty measured from probabilistic solution and produces equally plausible models those honor all the input used. During the stochastic inversion, Bayesian inference and Markov Chain Monte Carlo sampling algorithms are used. Bayesian inference is used to integrate all the available information, Geological Modeling/Core & Wells Evaluation Subroutine The geophysical modelling steps can be performed by the processor 100 of the QSIM system server 10, which is configured by executing one or more of the modules including, for example and without limitation, the core/well evaluator 155. The geological modelling steps, shown in FIG. 5B, involves core and well evaluation data processing and the steps are further described below in greater detail.

Core Description (522)

In this step a geologist will describe the core samples in terms of lithological facies and develop a general understanding on how the rock was deposited and provide those core description details as inputs into the QSIM system. This leads to developing a depositional environment and its pertinent lithofacies with varying depth.

Formation Evaluation (524)

The Formation Evaluation step involves interpretation of measured wireline data to derive fundamental reservoir properties, such as water saturation, porosity and mineral compositional volumes. This helps to understand if the rock layer is potentially a good or poor reservoir and is hydrocarbon or water bearing.

Seismic Petro (526)

The main goal of seismic petrophysics is to condition and quality control the three main well logs, namely, bulk density, compressional sonic and shear sonic data sets, that help generate a multitude of elastic logs and those the seismic is measuring. This step utilizes the parameters that both the seismic and logs are measuring, which is called the elastic rock parameter. This step can involve generating and fixing bad borehole affected density sections from compressional sonic, predicting shear from sonic, even fixing sonic itself, like despiking etc. The seismic petrophysically conditioned well logs are preferable for rock physics analysis.

Rock Physics Analysis (528)

Rock Physics is a science which studies the relationship between the changes in seismic characteristics of wave propagation due to different rock properties. This step pertains to calculating elastic attributes such as (acoustic impedance or velocity ratio) using the measured, seismic petrophysically corrected wireline datasets and developing the relationship with reservoir properties. This involves modeling the rock matrix and rock pore fluid properties using different established empirical, numerical or statistical rock information to understand the dynamics and effect of reservoir properties, such as porosity, water saturation or mineral volumes on the elastic attributes. This helps in translating seismic inversion results into reservoir properties.

Rock Physics Elastic Facies (530)

Rock Physics Elastic Facies, sometimes also termed as Rock Physics Seismic Lithofacies, generally describes the definition of sedimentary lithological facies on elastic properties, such as the widely used acoustic impedance or velocity ratio. As is known, the sedimentary lithological facies or lithofacies can originate from a broad spectrum of stratigraphic and structural nomenclature and are ideal to facilitate combined interpretation from multi-disciplinary domains. On the contrary, elastic properties are more commonly known to geophysicists or geoscientist dealing with geomechanical aspects of the field development. Hence the rock physics elastic facies serve the following main purposes:

Definition of sedimentological framework on to elastic properties;
Provides bridging between petrophysical, sedimentological and elastic attributes;
Transformation and evaluation of 3D seismic inversion results in terms, more understandable by multi-domain geoscientists; and
Evaluation and management of data scales i.e. from cores to 3D seismic for robust spatial interpretations.

There are however traditional approaches in absence of detailed core sedimentology where statistical methods are employed to predict and classify logs for an interested facies framework. This would include traditional well logs and developed facies could either be pay based nomenclature or developed on geological or reservoir understanding.

In other cases, special core analysis SCAL can be present, where porosity-permeability based facies framework is developed upon rock quality, flow zones indices etc. (RQI, FZI). These flow based facies are tied to the elastic logs and up scaled as needed.

Elastic Facies to Flow Unit (532)

One of the steps in the QSIM workflow can be to link the core facies with the elastic facies. The core facies are defined using core data whereas the elastic facies are predicted with the elastic logs as input using statistical techniques. Core data can include flow units. A flow unit is defined as a mappable portion of the total reservoir within which geological and petrophysical properties that affect the flow of fluids are consistent and predictably different from the properties of other reservoir rock volumes. In some reservoirs the flow units might not be available, but if this information is present is preferably should be tied to the elastic facies.

In this step, key wells are selected to build a reference elastic facies model and several realizations are run to obtain the optimum results. The predicted facies are then quality checked to ensure that facies comport with the geological framework. Then, the reference model is propagated to non-key wells for facies prediction based on the elastic logs obtained for the non-key wells. The next step is to associate the predicted facies with the core facies for calibration. Once the calibration is done then these facies are used with inverted seismic data for prospects generation, such as finding reservoirs that are suitable for extracting resources.

More specifically, as noted above, the core facies are defined from a detailed observation of the rock samples to provide various geological information, for example the depositional environment of the rock, color/texture of the rock, beddings, grain size etc. The idea is to distinguish the reservoir rock from non-reservoir rock, in other words, hydrocarbon bearing rock vs non-hydrocarbon bearing rock. Elastic facies are facies defined using well-log attributes elastic logs measured in a wellbore including, for example, bulk density, sonic velocities, and acoustic impedance, with or without including the core facies. Predicted facies are generated for wells where core facies are not available. Predicted facies are determined for a well using a model based on elastic facies combined with core facies to predict facies.

In step 532, the elastic facies are associated with the core facies for calibration to make sure that they make geological sense. In particular, the defined facies after core calibration, which comprise the elastic facies, are checked against different Rock Physics attributes e.g. compressional velocity (Vp), shear velocity (Vs), compressional to shear velocity ratio (Vp/Vs), acoustic impedance (AI) etc. to make sure that facies can be seen in the elastic domain and are consistent with established geological principles or, in other words, make geological sense.

The ultimate objective of the QSIM workflow is to derive the reservoir properties by integrating the seismic amplitudes to geocellular models. In order to build the connection between the core/geological data and the seismic data, the QSIM system defines the elastic facies, since the seismic data records the elastic response of the subsurface after all.

As shown in FIG. 5A, the result of the Core Description (522), Formation Evaluation (524), Rock Physics Analysis (528) and Rock Physics Elastic Facies (530) can be provided as an input to the 2D Layer Model (544), 1D to 2D Facies Model (546) and 2D to 3D grid Development (548) steps of the Depositional analysis sub-routine further described herein.

Conceptual Modelling/Depositional Analysis

Figure 5D:
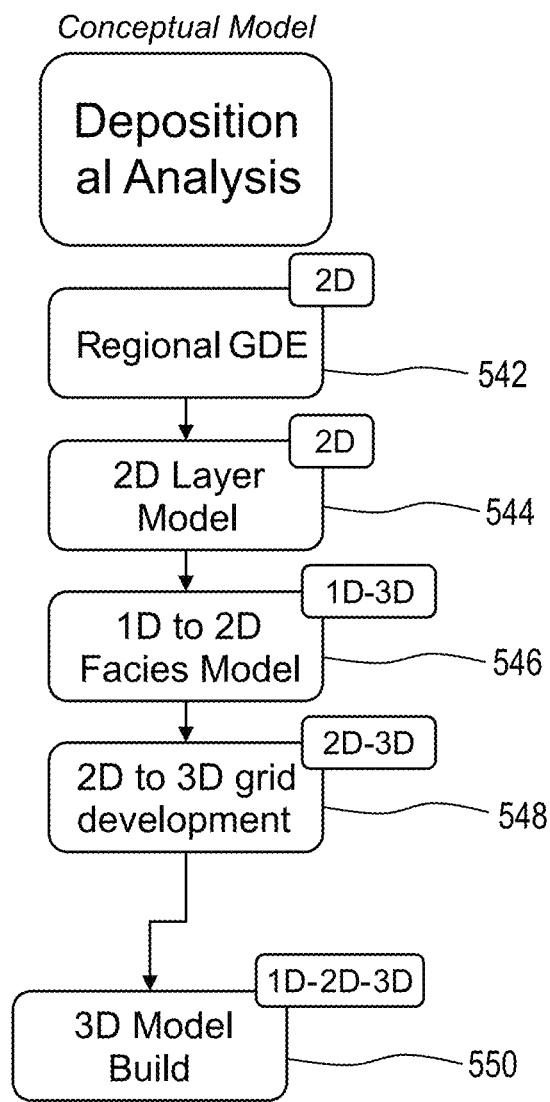
FIG. 5D is a flow diagram illustrating a subroutine of the exemplary QSIM workflow of FIG. 5A according to the principles of the disclosure.

The conceptual modelling and depositional analysis steps can be performed by the processor 100 of the QSIM system server 10, which is configured by executing one or more of the modules including, for example and without limitation, the depositional analyzer 160. FIG. 5D illustrates the conceptual modelling subroutine which involves depositional analysis. In particular, the subroutine of FIG. 5D includes the steps: Regional GDE (542); 2D Layer Model (544); 1D to 2D Facies Model (546); 2D to 3D grid development (548); 3D Model Build (550). Each of these steps are described in greater detail below.

Regional GDE (542)

Regional Gross Depositional Environments (GDE) are generated by core sedimentologists after interpretation of core and input into the QSIM system. Different facies seen in the cores relate to specific depositional environments and these are correlated across the wells to generate a regional map. These are important to understand the depositional geometries and facies associations in the region.

2D Layer Model (544)

Once the regional depositional environment framework is established, different key layers, stratigraphic tops are interpreted across the key wells. This layer correlation formulates the 2D layer model and clearly differentiating different sediments from each other vertically and horizontally. Layer cake geology is implemented to produce a layer-cake 2D model.

1D to 2D Facies Model (546)

The core facies, stratigraphic tops are generally described on cored wells, which are a certain percentage of the actual wells in a given field. This interpretation is propagated to the uncored wells using different statistical methods and formulate the 2D facies model across a given field.

2D to 3D Grid Development (548)

In this step, the 2D layer models are combined with 3D surfaces to build a 3D stratigraphic grid. The 3D surfaces could be from the gross depositional environment or from seismic time horizon interpretations.

3D Model Build (550)

In this step, the base case 3D geological model is generated by fully integrating all the 1D, 2D and 3D stratigraphic information into one 3D grid. This model is used as a container and filled with different properties to define the reservoir development scenarios thereby generating a conceptual and depositional model. This model is also used for various realizations and uncertainty analysis.

Model Integration Subroutine

Figure 5E:
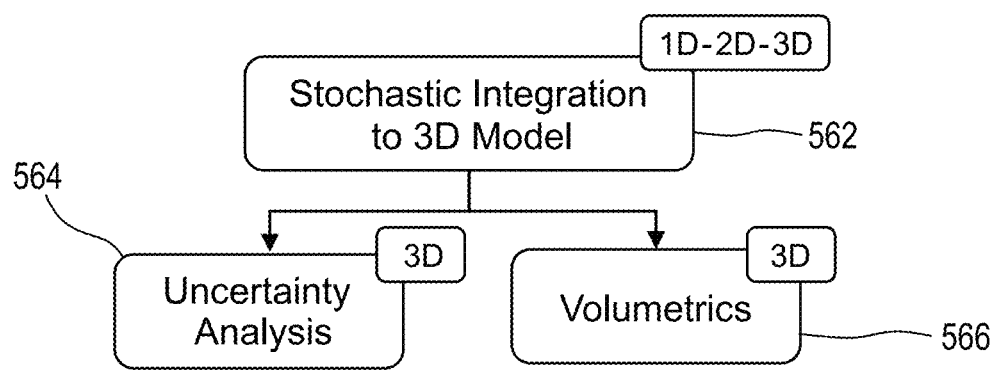
FIG. 5E is a flow diagram illustrating a subroutine of the exemplary QSIM workflow of FIG. 5A according to the principles of the disclosure.

The model integration subroutine can be performed by the processor 100 of the QSIM system server 10, which is configured by executing one or more of the modules including, for example and without limitation, the model integrator 165. FIG. 5E illustrates the model integration steps of the routine 500, which are described in greater detail below.

Stochastic Integration to 3D Model (562)

The Stochastic Integration to 3D Model step integrates the results of the Geophysical Model, Geological Model and Conceptual/Depositional Model subroutines to generate an integrated 3D model. Seismic inversion converts the seismic amplitude data to rock properties and can be at two main scales. Deterministic scale is at seismic resolution level and stochastic inversion is at a higher resolution. For QSIM, stochastic inversion is preferred utilizing several wells in the field and generating several realizations from this stochastic step. For clarity, a realization is an observed value of a random variable that is observed during the geostatistical simulation and picked as a correct answer. These realizations are in time, converted to depth and then integrated to the 3D model grid. The integration is smooth as the seismic inversion step is performed using the same 3D grid as the 3D model and hence fits into the same container. For instance, this kind of integration can be performed in scenarios. In a first scenario, the geo modeler uses the wells only to populate, then uses the seismic derived model as a trend in the second scenario and ultimately uses the model that is already built using the QSIM workflow as the final scenario to use in the geological grid as is, because all the information is actually integrated to come with this QSIM final output.

As noted, scaling 3D seismic for integration with other data is a challenge. The exemplary QSIM systems and methods overcomes this challenge by using the geological grid model as the starting container to run the inversion in depth domain together with an accurate velocity model that starts from dense seismic velocity picking, and this enables the iterative interpretation of seismic horizons. As a result, the whole process is firmly linked.

Uncertainty Analysis (564)

Stochastic Seismic Inversion integrated 3D model can then be used to generate several realizations to capture the uncertainty. For instance, three percentiles (P10, P50 and P90) are generally calculated based on pay volume as a criteria and then evaluated to understand the field development uncertainty. The uncertainty can be quantitatively assessed since all the output models match all the input data. Additionally, the system can determine the range of reservoir possibilities within the constraining data using geostatistical methods.

Volumetrics (566)

Based on the final models, potential resource assessment can be done on different realizations to calculate the volumes in place and classify them under P10, P50 and P90 percentiles.

QSIM workflow uses leading edge geostatistical techniques, including, the Markov Chain Monte Carlo (MCMC) sampling and pluri-Gaussian modelling of lithology. It is thus configured to exploit "informational synergies" to retrieve details that deterministic inversion techniques blur out or omit. As a result the system can reconstruct both the overall structure and the fine details of the reservoir more accurately than existing methods. The use of multiple angle stack seismic volumes in AVA Geostatistical Inversion enables further evaluation of elastic rock properties and probable lithology/facies and fluid distributions with greater accuracy.

At integral part of the QSIM workflow is building the reservoir model, which will be constructed with properties derived from seismic data (lithology, porosity and porefluid). In this regard, the system implements a workflow for correctly sampling properties from the seismic grid to a reservoir model with a geocellular grid. The final reservoir model produced thus can be easily updateable with new well, production, and interpretation information.

Technical problems that the disclosed embodiments of the QSIM systems and methods solve include:
- It solves the problem of inconsistencies in seismic data which leads to ambiguous inversion results.
- It solves the petrophysical relationship with elastic properties and how many can be derived from the seismic attributes.
- It solves the integration bottle neck of seismic data with high resolution geocellular models.
- It solves the problem of having unreliable reservoir property distribution in the geocellular model.
- It solves the time issue for mega projects with tight deadlines.

Additional benefits provided by the disclosed embodiments of the QSIM systems and methods include, firstly, an accurate and consistent approach to calibrate logs across the field which enables to generate high quality log data for rock physics and seismic inversion studies. Secondly, it eliminates the need of having the marker data and petrophysical analysis, which usually are required using conventional workflow for log calibration. The marker data and the petrophysical analysis are usually not available for all wells at the time of logs quality control (QC) time. Thirdly, it saves significant time for large projects by accelerating the QC process.

The terms "a," "an," and "the," as used in this disclosure, means "one or more," unless expressly specified otherwise.

The term "communicating device," as used in this disclosure, means any hardware, firmware, or software that can transmit or receive data packets, instruction signals or data signals over a communication link. The communicating device can include a computer or a server. The communicating device can be portable or stationary.

The term "communication link," as used in this disclosure, means a wired or wireless medium that conveys data or information between at least two points. The wired or wireless medium can include, for example, a metallic conductor link, a radio frequency (RF) communication link, an Infrared (IR) communication link, or an optical communication link. The RF communication link can include, for example, Wi-Fi, WiMAX, IEEE 802.11, DECT, 0G, 1G, 2G, 3G or 4G cellular standards, or Bluetooth.

The terms "computer" or "computing device," as used in this disclosure, means any machine, device, circuit, component, or module, or any system of machines, devices, circuits, components, or modules which are capable of manipulating data according to one or more instructions, such as, for example, without limitation, a processor, a microprocessor, a graphics processing unit, a central processing unit, a general purpose computer, a super computer, a personal computer, a laptop computer, a palmtop computer, a notebook computer, a desktop computer, a workstation computer, a server, a server farm, a computer cloud, or an array of processors, microprocessors, central processing units, general purpose computers, super computers, personal computers, laptop computers, palmtop computers, notebook computers, desktop computers, workstation computers, or servers.

The term "computer-readable medium," as used in this disclosure, means any storage medium that participates in providing data (for example, instructions) that can be read by a computer. Such a medium can take many forms, including non-volatile media and volatile media. Non-volatile media can include, for example, optical or magnetic disks and other persistent memory. Volatile media can include dynamic random access memory (DRAM). Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave, or any other medium from which a computer can read. The computer-readable medium can include a "Cloud," which includes a distribution of files across multiple (for example, thousands of) memory caches on multiple (for example, thousands of) computers.

Various forms of computer readable media can be involved in carrying sequences of instructions to a computer. For example, sequences of instruction (i) can be delivered from a RAM to a processor, (ii) can be carried over a wireless transmission medium, or (iii) can be formatted according to numerous formats, standards or protocols, including, for example, Wi-Fi, WiMAX, IEEE 802.11, DECT, 0G, 1G, 2G, 3G, 4G, or 5G cellular standards, or Bluetooth.

The term "database," as used in this disclosure, means any combination of software or hardware, including at least one application or at least one computer. The database can include a structured collection of records or data organized according to a database model, such as, for example, but not limited to at least one of a relational model, a hierarchical model, or a network model. The database can include a database management system application (DBMS) as is known in the art. The at least one application may include, but is not limited to, for example, an application program that can accept connections to service requests from clients by sending back responses to the clients. The database can be configured to run the at least one application, often under heavy workloads, unattended, for extended periods of time with minimal human direction.

The terms "including," "comprising" and their variations, as used in this disclosure, mean "including, but not limited to," unless expressly specified otherwise.

The term "network," as used in this disclosure means, but is not limited to, for example, at least one of a local area network (LAN), a wide area network (WAN), a metropolitan area network (MAN), a personal area network (PAN), a campus area network, a corporate area network, a global area network (GAN), a broadband area network (BAN), a cellular network, or the Internet, any of which can be configured to communicate data via a wireless or a wired communication medium. These networks can run a variety of protocols not limited to TCP/IP, IRC or HTTP.

The term "server," as used in this disclosure, means any combination of software or hardware, including at least one application or at least one computer to perform services for connected clients as part of a client-server architecture. The at least one server application can include, but is not limited to, for example, an application program that can accept connections to service requests from clients by sending back responses to the clients. The server can be configured to run the at least one application, often under heavy workloads, unattended, for extended periods of time with minimal human direction. The server can include a plurality of computers configured, with the at least one application being divided among the computers depending upon the workload. For example, under light loading, the at least one application can run on a single computer. However, under heavy loading, multiple computers can be required to run the at least one application. The server, or any if its computers, can also be used as a workstation.

The term "transmission," as used in this disclosure, means the conveyance of signals via electricity, acoustic waves, light waves and other electromagnetic emissions, such as those generated with communications in the radio frequency (RF) or infrared (IR) spectra. Transmission media for such transmissions can include coaxial cables, copper wire and fiber optics, including the wires that comprise a system bus coupled to the processor.

Devices that are in communication with each other need not be in continuous communication with each other unless expressly specified otherwise. In addition, devices that are in communication with each other may communicate directly or indirectly through one or more intermediaries.

Although process steps, method steps, or algorithms may be described in a sequential or a parallel order, such processes, methods and algorithms may be configured to work in alternate orders. In other words, any sequence or order of steps that may be described in a sequential order does not necessarily indicate a requirement that the steps be performed in that order; some steps may be performed simultaneously. Similarly, if a sequence or order of steps is described in a parallel (or simultaneous) order, such steps can be performed in a sequential order. The steps of the processes, methods or algorithms described in this specification may be performed in any order practical.

When a single device or article is described, it will be readily apparent that more than one device or article may be used in place of a single device or article. Similarly, where more than one device or article is described, it will be readily apparent that a single device or article may be used in place of the more than one device or article. The functionality or the features of a device may be alternatively embodied by one or more other devices which are not explicitly described as having such functionality or features.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. A computer implemented method of modelling a subsurface region of the earth for hydrocarbon exploration, development, or production, the method comprising:

receiving into a processing system pre-stack seismic datasets measured for one or more locations within the subsurface region and well log datasets measured from wells within the subsurface region, wherein the seismic datasets comprise three-dimensional (3D) seismic amplitude data and wherein the well log datasets comprise core data and elastic logs;

selecting, with the processing system, key wells from among the wells based on the well log datasets;

generating, based on the seismic datasets, a geophysical model, wherein the geophysical model is 3D and wherein generating the geophysical model includes:

measuring, based on the seismic amplitude data and the well log datasets for the key wells, an amplitude variation with offset (AVO) response of the seismic amplitude data to determine whether the measured AVO response meets prescribed requirements, wherein the step of measuring AVO to determine whether the measured AVO response meets prescribed requirements includes:

performing a full waveform inversion process to generate synthetic seismic gathers using wavelets estimated from original input seismic data, convolved with reflectivity calculated from the elastic well logs, and comparing, a measured AVO response from the synthetic seismic gathers with a measured AVO response of the processed seismic amplitude data to determine whether the measured AVO response meets prescribed requirements, in response to determining that the measured AVO response does not meet the prescribed requirements, iteratively changing at least one seismic amplitude data processing parameter and re-processing the seismic amplitude data and repeating the step for measuring AVO at least until determining that the AVO response meets the prescribed requirements, and performing a stochastic inversion process on the re-processed seismic amplitude data;

generating based on the well log datasets, a geological model, wherein generating the geological model includes:

defining core facies from the core data for the key wells, generating, based on the elastic logs for the key wells and according to the stochastic inversion process of the re-processed seismic amplitude data, an elastic facies model for predicting elastic facies from elastic logs, and associating the elastic facies with the core facies;

generating a conceptual depositional model of the subsurface region; and integrating the generated geophysical model, geological model and conceptual depositional model into a 3D reservoir model for the subsurface region using a stochastic integration and using probabilistic models to quantify uncertainties of the 3D reservoir model by generating multiple realizations of the reservoir model capturing multiple possible scenarios, wherein the stochastic inversion process on the re-processed seismic amplitude data is performed using a same 3D grid as the 3D reservoir model, wherein the 3D grid is in a depth domain, wherein the stochastic inversion process is performed in the depth domain on the re-processed seismic amplitude data, wherein the stochastic inversion process applies Bayesian interference and Markov Chain Monte Carlo sampling algorithms using core data and elastic logs for the key wells and a velocity model linking the depth domain and a time domain of the seismic datasets to generate the geophysical model in the depth domain, wherein the step of generating the elastic facies model comprises:

generating, using elastic log data for the key wells and statistical analysis techniques, a reference elastic facies model defining the elastic facies, associating the defined elastic facies with the core facies for the key wells, applying the reference elastic facies model to elastic logs for non-key wells among the wells to predict elastic facies for the non-key wells, and associating the predicted elastic facies with core facies from the non-key wells;

wherein the steps of generating the elastic facies model, generating the geological model and generating the geophysical model are performed in parallel; and updating the elastic facies model, the geological model, the geophysical model, and the integrated 3D reservoir model using based on one or more of: new pre-stack seismic datasets measured within the subsurface region, and new well log datasets measured from wells within the subsurface region.

2. The method of claim 1, wherein generating the geological model further comprises: performing a deterministic inversion process on the re-processed seismic amplitude data, and performing the stochastic inversion process based on the deterministic inversion of the re-processed seismic amplitude data.

3. The method of claim 1, further comprising:

comparing the AVO response of the re-processed seismic amplitude data at the key wells to the well log dataset for the key wells to determine the AVO response meets prescribed requirements.

4. The method of claim 1, further comprising:

generating the well logs, wherein the well logs are generated by passing well logging tools through the wells and measuring the elastic logs using measurement tools and measuring the core data from physical samples of the wells; and generating the seismic datasets using a seismic sensor device.

5. The method of claim 4, wherein the elastic logs comprise one or more of compressional sonic, shear sonic, bulk density and resistivity measurements.

6. The method of claim 1, further comprising:

checking the elastic facies against Rock Physics attributes including one or more of compressional velocity (Vp), shear velocity (Vs), compressional to shear velocity ratio (Vp/Vs), acoustic impedance (AI) for consistency with Rock Physics principles.

7. The method of claim 1, wherein the step of generating a conceptual depositional model comprises:

generating a 3D stratigraphic grid of the subsurface region in accordance with the geological model.

8. The method of claim 7, wherein the step of generating the conceptual depositional model comprises:

integrating 1D, 2D and 3D stratigraphic information of the geological model into the 3D stratigraphic grid.

9. The method of claim 7, wherein the step of integrating the generated geophysical model, geological model and conceptual depositional model comprises:
for cells of the 3D stratigraphic grid, sampling properties from the geophysical model for respective cells and populating the respective cells with the sampled properties.

10. The method of claim 1, further comprising generating a visualization of the three-dimensional subsurface region using the 3D reservoir model.

11. The method of claim 1, further comprising, extracting natural resources from the subsurface region at a location determined using the 3D reservoir model.

12. A system for modelling a subsurface region of the earth for hydrocarbon exploration, development, or production, the apparatus comprising:
a computing device including:
a non-transitory storage medium,
an interface for receiving pre-stack seismic datasets measured for one or more locations within the subsurface region and well log datasets measured from wells within the subsurface region, wherein the seismic datasets comprise three-dimensional (3D) seismic amplitude data and wherein the well log datasets comprise core data and elastic logs,
a processor, wherein the processor is configured by executing code that is in the form of one or more modules stored in the non-transitory storage medium, wherein the one or more modules configure the processor to:
select key wells from among the wells based on the well log datasets,
generate, based on the seismic datasets and the well log datasets and according to the stochastic inversion process of the re-processed seismic amplitude data, a geophysical model, wherein the geophysical model is generated by:
measuring, based on the seismic amplitude data and the well log datasets for the key wells, an amplitude variation with offset (AVO) response of the seismic amplitude data,
determining whether the measured AVO response meets prescribed requirements, wherein determining whether the measured AVO response meets prescribed requirements includes:
performing a full waveform inversion process to generate synthetic seismic gathers using wavelets estimated from original input seismic data, convolved with reflectivity calculated from the elastic well logs, and
comparing, a measured AVO response from the synthetic seismic gathers with a measured AVO response of the processed seismic amplitude data to determine whether the measured AVO response meets prescribed requirements,
in response to determining that the measured AVO response does not meet the prescribed requirements, iteratively changing at least one seismic amplitude data processing parameter and re-processing the seismic amplitude data and repeating the step for measuring AVO at least until the AVO response meets the prescribed requirements, and
performing a stochastic inversion process on the re-processed seismic amplitude data,
generate based on the well log datasets, a geological model, wherein generating the geological model includes:
defining core facies from the core data for the key wells,
generating, based on the elastic logs for the key wells, an elastic facies model for predicting elastic facies from elastic logs, and
associating the elastic facies with the core facies,
generate a conceptual depositional model of the subsurface region based on the well log datasets, and
integrate the generated geophysical model, geological model and conceptual depositional model into a 3D reservoir model for the subsurface region using a stochastic integration and using probabilistic models to quantify uncertainties of the 3D reservoir model by generating multiple realizations of the reservoir model capturing multiple possible scenarios, wherein the stochastic inversion process on the re-processed seismic amplitude data is performed using a same 3D grid as the 3D reservoir model, wherein the 3D grid is in a depth domain and the stochastic inversion process is performed in the depth domain on the re-processed seismic amplitude data, wherein the stochastic inversion process applies Bayesian interference and Markov Chain Monte Carlo sampling algorithms using core data and elastic logs for the key wells and a velocity model linking the depth domain and a time domain of the seismic datasets to generate the geophysical model in the depth domain,
wherein the processor is configured to generate the elastic facies model by:
generating, using elastic log data for the key wells and statistical analysis techniques, a reference elastic facies model defining the elastic facies,
associating the defined elastic facies with the core facies for the key wells,
applying the reference elastic facies model to elastic logs for non-key wells among the wells to predict elastic facies for the non-key wells, and
associating the predicted elastic facies with core facies from the non-key wells,
wherein the processor is configured to generate the elastic facies model, generate the geological model and generate the geophysical model in parallel, and
wherein the processor is configured to update the elastic facies model, the geological model, the geophysical model, and the integrated 3D reservoir model using based on one or more of: new pre-stack seismic datasets measured within the subsurface region, and new well log datasets measured from wells within the subsurface region.

13. The system of claim 12, further comprising:
one or more sensor devices in communication with the computing device via the interface.

14. The system of claim 13, wherein the one or more sensor devices include: well logging tools configured to be passed through the wells and measure the elastic logs, wherein the elastic logs comprise one or more of compressional sonic, shear sonic, bulk density and resistivity measurements.

15. The system of claim 13, wherein the one or more sensor devices include a seismic sensor device configured to measure the seismic amplitude data.

16. The system of claim 12, further comprising an implementation tool for hydrocarbon exploration, development or product at a location within the subsurface region specified by the 3D reservoir model.

17. The system of claim 12, further comprising: a display device in communication with the computing device, wherein the processor is configured to generate images simulating subsurface reservoir properties represented by the 3D reservoir model.

18. The system of claim 12, wherein the processor is configured to determine the AVO response meets the prescribed requirements by comparing the AVO response of the re-processed seismic amplitude data at the key wells to the well log datasets for the key wells.

19. The system of claim 12, wherein generating the geological model includes:
   checking the elastic facies against Rock Physics attributes including one or more of compressional velocity (Vp), shear velocity (Vs), compressional to shear velocity ratio (Vp/Vs), acoustic impedance (AI) for consistency with Rock Physics principles.

20. The system of claim 12, wherein the conceptual depositional model is generated by:
   generating a 3D stratigraphic grid of the subsurface region in accordance with the geological model, and
   integrating 1D, 2D and 3D stratigraphic information of the geological model into the 3D stratigraphic grid, and
   for each of a plurality of cells of the 3D stratigraphic grid, sampling properties from the geophysical model for respective cells and populating the respective cells with the sampled properties.

* * * * *